(12) United States Patent
Westervelt et al.

(10) Patent No.: US 11,003,146 B2
(45) Date of Patent: May 11, 2021

(54) DISTRIBUTED OPTIMAL CONTROL OF AN AIRCRAFT PROPULSION SYSTEM

(71) Applicant: GENERAL ELECTRIC COMPANY, Schenectady, NY (US)

(72) Inventors: Eric Westervelt, Niskayuna, NY (US); James Reepmeyer, Evendale, OH (US); Reza Ghaemi, Watervliet, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 73 days.

(21) Appl. No.: 16/527,896

(22) Filed: Jul. 31, 2019

(65) Prior Publication Data

US 2019/0391540 A1 Dec. 26, 2019

Related U.S. Application Data

(63) Continuation-in-part of application No. 15/462,136, filed on Mar. 17, 2017, now Pat. No. 10,461,540.

(51) Int. Cl.

| | |
|---|---|
| *G05B 13/04* | (2006.01) |
| *B64D 33/00* | (2006.01) |
| *H04L 9/06* | (2006.01) |
| *G06F 17/11* | (2006.01) |
| *F02C 9/00* | (2006.01) |

(52) U.S. Cl.
CPC .......... *G05B 13/041* (2013.01); *B64D 33/00* (2013.01); *F02C 9/00* (2013.01); *G05B 13/048* (2013.01); *G06F 17/11* (2013.01); *H04L 9/0643* (2013.01); *F05D 2220/323* (2013.01); *H04L 2209/38* (2013.01)

(58) Field of Classification Search
CPC ......... G05B 13/041; B64D 33/00; F02C 9/00; F05D 2220/323; H04L 2209/38
USPC .......................................................... 307/31
See application file for complete search history.

(56) References Cited

U.S. PATENT DOCUMENTS

| | | | |
|---|---|---|---|
| 8,260,468 B2 | 9/2012 | Ippolito et al. | |
| 8,818,889 B2 | 8/2014 | Papavasiliou et al. | |
| 8,955,365 B2* | 2/2015 | do Amaral ........... | G05B 23/024 |
| | | | 73/1.72 |
| 9,411,329 B2 | 8/2016 | Greene et al. | |
| 10,530,163 B2* | 1/2020 | Rodriguez ................ | H02J 4/00 |
| 2004/0093130 A1* | 5/2004 | Osder ..................... | B64C 27/24 |
| | | | 701/3 |

(Continued)

FOREIGN PATENT DOCUMENTS

CN 102437653 B 3/2015

*Primary Examiner* — Alfonso Perez Borroto
(74) *Attorney, Agent, or Firm* — Dority & Manning, P.A.

(57) ABSTRACT

Some embodiments provide a distributed optimization framework and technology for the control of aggregated propulsion system components that iteratively operates until a commanded propulsion-related profile is produced by aggregated components of the propulsion system. Some embodiments use a distributed iterative solution in which each component solves a local optimization problem with local constraints and states, while using global variables that are based upon information from each other component. The global variables may be determined via a distributed transaction system using component-specific information obtained from each component at each iteration. The global variables may be broadcast to the components for each new iteration.

18 Claims, 14 Drawing Sheets

(56) References Cited

U.S. PATENT DOCUMENTS

| | | | |
|---|---|---|---|
| 2012/0221193 A1* | 8/2012 | Delaye | G05B 23/0283 |
| | | | 701/31.9 |
| 2015/0295405 A1 | 10/2015 | Black et al. | |
| 2017/0040839 A1* | 2/2017 | Srivastava | G05B 15/02 |
| 2017/0323274 A1* | 11/2017 | Johnson | G05B 23/0251 |
| 2018/0119628 A1* | 5/2018 | Zeller | F02D 41/1402 |

* cited by examiner

DISTRIBUTED OPTIMAL CONTROL OF AN AIRCRAFT PROPULSION SYSTEM

TECHNICAL FIELD

This disclosure generally relates to distributed control of aircraft propulsion systems.

BACKGROUND

Distributed coordination among multiple agents have previously been the subject of much research, particularly from a controls system perspective. It has applications in the areas of UAV coordination, power systems, flocking of robots, etc. In applications with a large number of agents, centralized coordination among agents is traditionally intractable due to heavy communication and central computation demands.

As the number of distributed electrical sub-systems in aircraft and other systems increases, there exists a need for an efficient decentralized distributed control structure that operates optimally.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
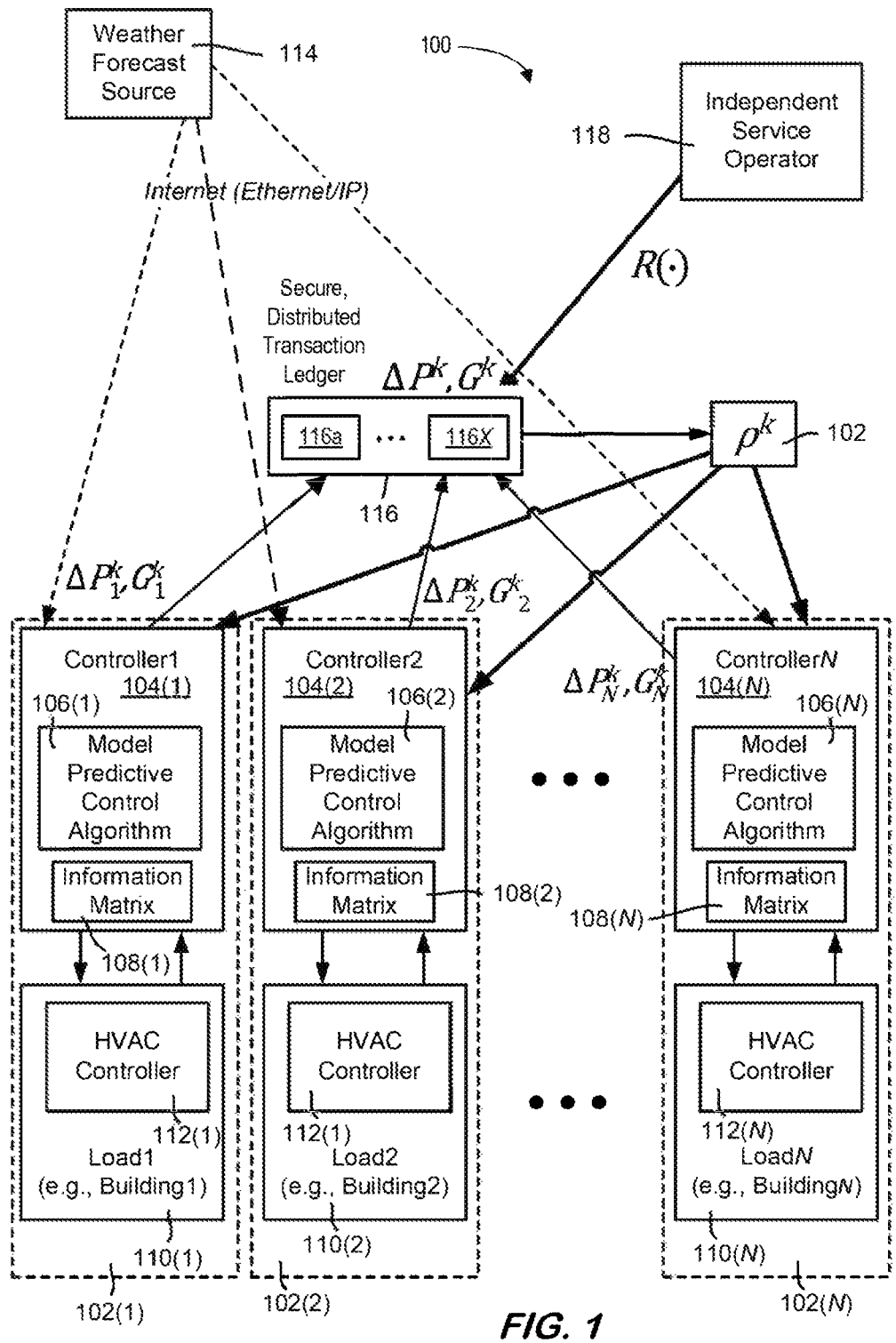
FIG. 1 is an example block diagram representation of an environment in which a secure, distributed transaction ledger load structure communicates with nodes corresponding to controlled loads, according to one or more example implementations.

In some embodiments, the present disclosure is directed to aircraft power system coordination where many electrical assets (i.e., agents) will be coordinated and controlled, but the communication demand(s) of such coordination and control might make central coordination intractable. Various aspects of the technology disclosed herein is concerned with aggregation of electrical sub-systems (i.e., agents), including optimally controlling the electrical sub-systems in a distributed manner.

In general, each distributed flexibility resource node intends to operate optimally subject to local constraints and global constraint of aggregated power being equal to desired power. Each node (DER) calculates search direction at each device and updates the estimate of optimal control action using the calculated search direction and global quantities (such as step size and Lagrange multiplier associated with global power balance constraint) received from ledgers. To this end, the global qualities are calculated via a secure, distributed transaction ledger (e.g., a ledger utilizing blockchain technology) using information that is gathered from each node, with the newly calculated global qualities (such as, but not limited to, a Lagrange multiplier, associated with the constraint that requests that aggregated power needs to equal the command power generated by an independent service operator), broadcast to each node. According to some embodiments, nodes and/or other elements of the system may record information about load balancing so that further computations can be performed by the secure, distributed transaction ledger. According to some embodiments, the distributed ledger might be associated with the HYPERLEDGER® blockchain verification system or a similar arrangement.

The operations are iterative, each node uses the received global qualities to perform one iteration of an optimization algorithm that calculates the search direction using the given global qualities and sends updated information to the secure, distributed transaction ledger, the transaction ledger then recalculates new global qualities from the updated information, broadcasts the new global qualities to the nodes for a next optimization iteration, and so on, until the secure, distributed transaction ledger determines that a sufficient level (some defined level) of convergence is reached. This procedure is performed at each sample time and once convergence occurs, the loads apply the computed optimal control.

The technology described herein may be used to solve the network optimization problem of power tracking of aggregated loads in a distributed fashion (both on the load/component side and the distributed ledger side). More particularly, solving a large scale optimization problem arising from the optimization of (on the order of) hundreds of thousands or even millions of loads in a centralized way is computationally infeasible, whereby traditional approaches are not able to handle local constraints of the loads and achieve aggregated power tracking performance. In some aspects, the technology described herein provides an iterative, distributed way of computing optimization that makes solving such a large scale optimization problem tractable.

It should be understood that any of the examples herein are non-limiting. As such, the technology described herein is not limited to any particular implementations, embodiments, aspects, concepts, structures, functionalities or examples described herein. Rather, any of the implementations, embodiments, aspects, concepts, structures, functionalities or examples described herein are non-limiting, and the technology may be used in various ways that provide benefits and advantages in power control, Integrated Propulsion, Power, and Thermal Management (IPPTMS), and other applications and concepts in general.

In general, and as represented in FIG. 1, an environment 100 may contain a number of (distributed flexibility resource or DER) nodes 102(1)-102(N) that are managed as described herein with respect to power or one or more other) control commands. There may be any practical number of nodes, possibly on the order of millions. In some aspects, the present disclosure relates to a distributed transaction system including a centralized aggregator that communicates with each component (e.g., node) and coordinates the operation thereof, wherein a distributed coordination scheme is used to effectuate the job of the aggregator and communication between the components. In some embodiments, a secure transaction ledger may be used to implement and maintain a secure record of the determinations and calculations generated by the centralized aggregator and distributed coordination scheme aspects herein and communicated between the components, including, for example, one or more initial, intermediate, and final values, variables, and datasets.

The represented nodes 102(1)-102(N), comprise controllers 104(1)-104(N) having model predictive control algorithms 106(1)-106(N) and information matrixes 108(1)-108(N) that describe the local states and constraints of the node. One example state is the local weather forecast obtained from a source 114 such as the National Oceanic and Atmospheric Administration (NOAA), as the weather influences renewable power source output as well as corresponds to how much power a node is likely to need for heating or cooling, for example. Other states that may be maintained may be room temperatures, zone temperatures, heating and cooling characteristics, time of day, day of week and so on.

In some embodiments, the plurality of nodes 102(1)-102(N) may comprise controllers representative of components (i.e., sub-systems) comprising a system, each node having model predictive control algorithms 106(1)-106(N) and information matrixes 108(1)-108(N) that correspond to and describe the local states and constraints of each respective node. One example state in an IPPTMS context might be the local weather forecast for an aircraft flight route since the weather can affect the operational conditions for the aircraft.

The exemplified nodes 102(1)-102(N) are also represented in FIG. 1 as comprising loads 110(1)-110(N), which are further exemplified as being controllable by Heating, Ventilation and Air Conditioning ("HVAC") controllers 112(1)-112(N), respectively. A typical example of a load is a building, however it is understood that a building or the like may correspond to multiple, separate loads (e.g., separate nodes), and/or multiple buildings or the like may correspond to a single load (node). In the context or use-case of an IPPTMS, an example load may be any of the controllable electrical sub-systems of the aircraft.

The nodes 102(1)-102(N) are coupled via their respective controllers 104(1)-104(N) to a "secure, distributed transaction ledger" 116. As used herein, the phrase "secure, distributed transaction ledger" might refer to, for example, a system of individual ledgers 116a-116X, such as blockchains, each ledger 116a-116X being associated with a continuously growing list of records (e.g., blocks) that are linked and secured using cryptography. For example, each block in a ledger 116a-116X might contain a cryptographic hash of the previous block, a timestamp, transaction data, etc. As a result, each ledger 116a-116X may be resistant to modification of the data (because the original, correct data is stored in multiple locations). For use as a distributed ledger, each ledger 116a-116X may be managed as a peer-to-peer network collectively adhering to a protocol for inter-node communication and validating new blocks.

In general, and as described herein, the secure, distributed transaction ledger 116 receives a commanded power profile from an Independent Service Operator ("ISO") 118, and uses that information along with local load-specific information to compute a global Lagrange multiplier 102 (i.e., global optimization variable) mathematically represented by $\rho^k$ (at iteration k). Global Lagrange multipliers 102 (i.e., global optimization variables) computed by the secure, distributed transaction ledger 116 are sent to the controllers 104(1)-104(N), for use by each controller in solving its local optimization problem.

To summarize thus far, some aspects of the technology disclosed herein may be directed towards technical improvements to more optimally control multiple assets or agents comprising a system (e.g., electrical sub-systems of an aircraft), such that the aggregated power (or other one or more parameters) track a commanded power (or other one or more parameters) profile that comes from the independent service operator 118. The optimization problem is solved in a distributed way (on both the node side and the ledger side), where each distributed asset exchanges data with the distributed transaction system (e.g., secure, distributed transaction ledger) and performs one optimization iteration according to the distributed optimization scheme described herein to solve the global model predictive control optimization problem in a tractable fashion.

At the secure, distributed transaction ledger 116 (i.e., distributed transaction system), the Lagrange multiplier (e.g., global optimization variable) is a function of the commanded power (or other one or more parameters) profile and the local data that are sent to the secure, distributed transaction ledger 116 (i.e., distributed transaction system) at each iteration of optimization. The recalculated Lagrange multiplier is sent back to the nodes to be used thereby in the cost for a next iteration, and so on. As the nodes iterate synchronously, they converge towards an acceptable solution (that is, to a defined/predetermined convergence threshold) to the network/global Model Predictive Control ("MPC") optimization problem through, the aforementioned iterative distributed computation scheme.

Figure 2:
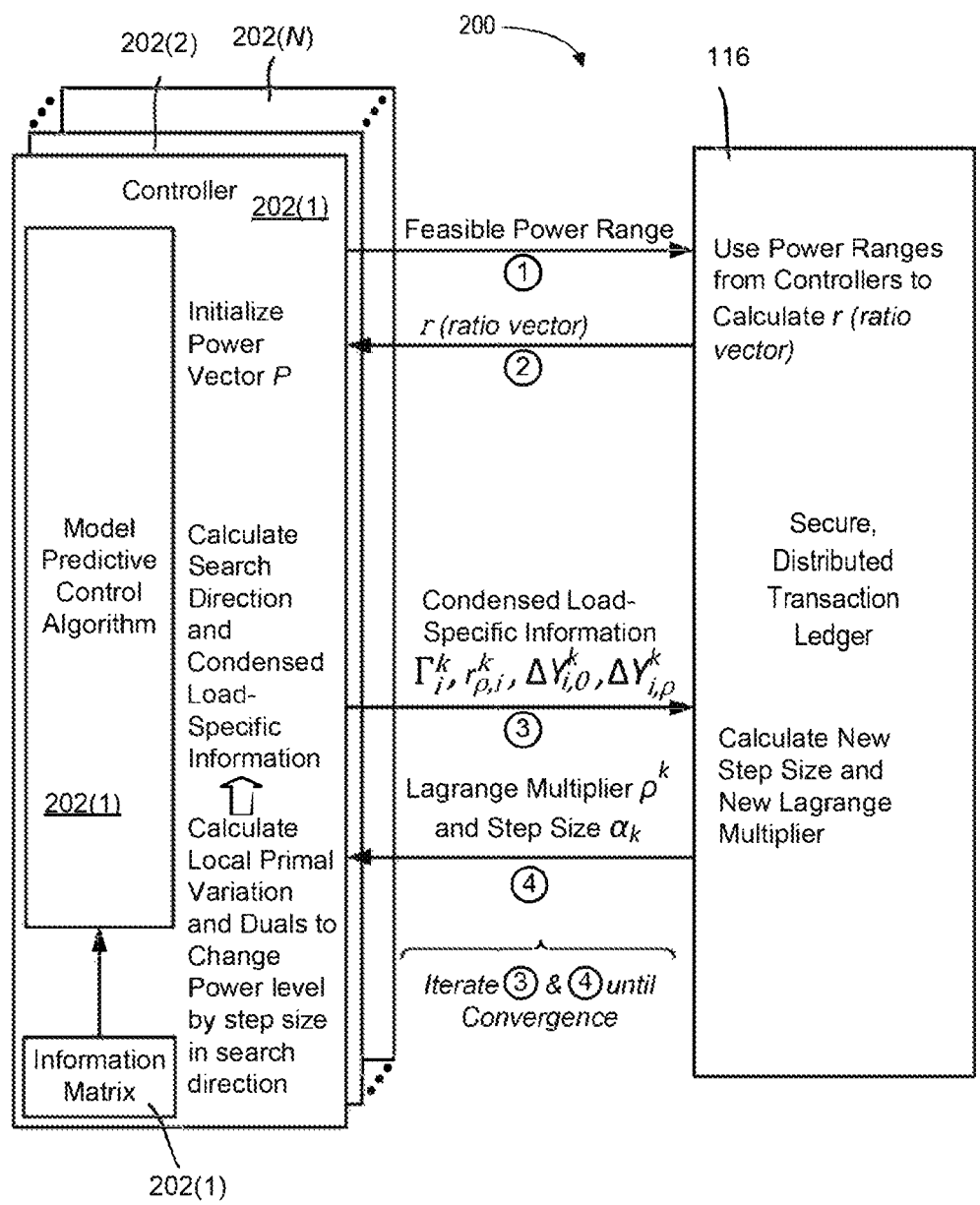
FIG. 2 is an example block/data flow diagram representing a controller communicating information with a secure, distributed transaction ledger to iteratively converge towards an optimal solution, according to one or more example implementations.
Figure 3:
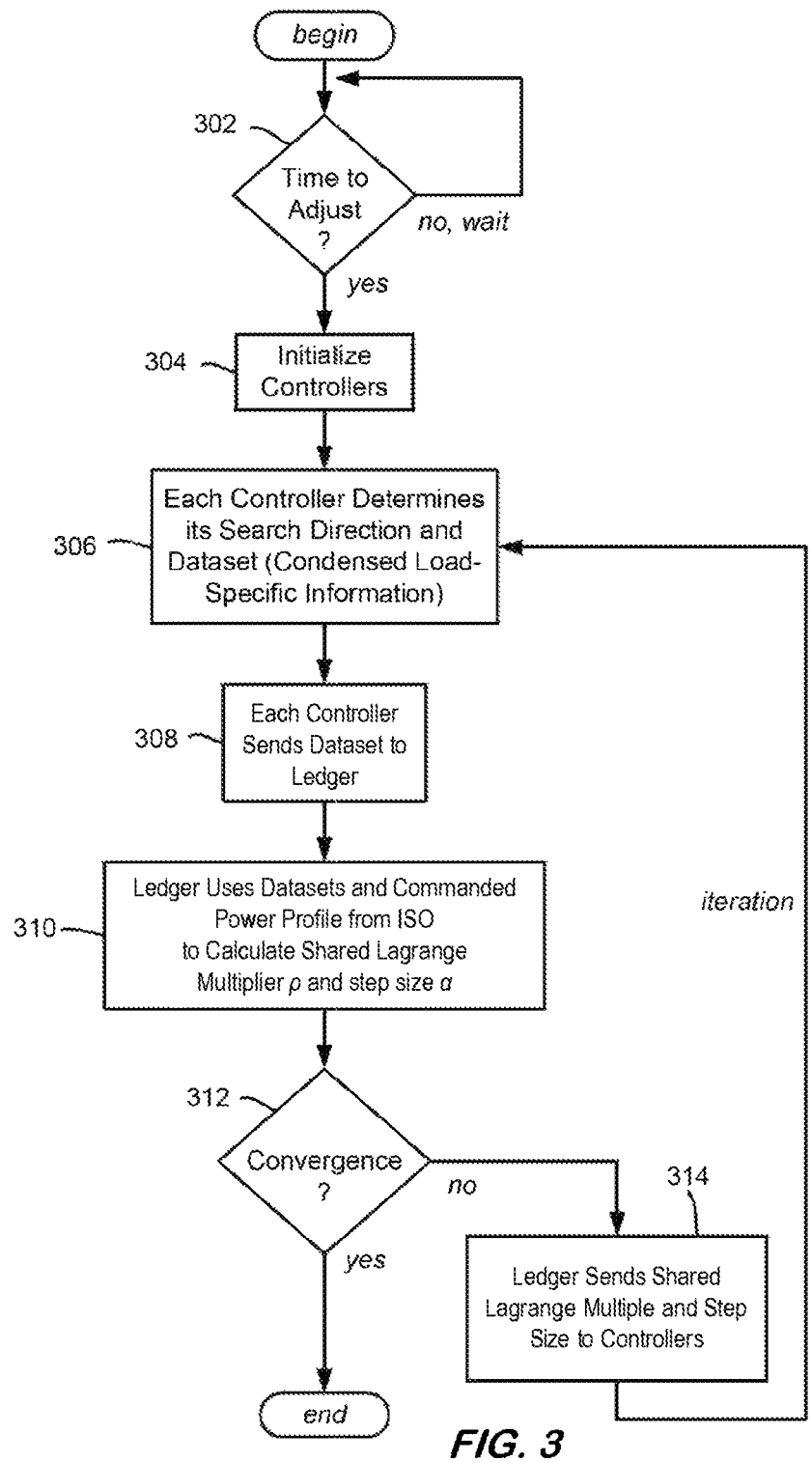
FIG. 3 is a flow diagram showing example operations of an iterative, distributed power control technology, according to one or more example implementations.

An example illustrative distributed power control framework will now be discussed in conjunction with the example block/data flow diagram of FIG. 2 depicting a controller communicating information with a secure, distributed transaction ledger (i.e., distributed transaction system) to iteratively converge towards an optimal solution and the flow diagram of FIG. 3 showing example operations of an iterative, distributed power (or other one or more parameters) control technology, according to one or more example implementations.

As represented by 200 in FIG. 2, for an example such as controller instance 204(1) (of a set of controller instances 204(1)-204(N)), the iterative distributed scheme can be described in the following operations, as also exemplified in the flow diagram of FIG. 3. At a time to adjust, such as once per minute (operation 302 of FIG. 3), each of the controllers are initialized (represented by labeled arrows one (1) and two (2) in FIG. 2, and also by operation 304 of FIG. 3). In general, and as further described herein, the controller 204(1) sends its feasible power range to the secure, distributed transaction ledger 116 (i.e., distributed transaction system), which then uses the feasible power ranges of the various controller instances 204(1)-204(N) to compute a ratio (e.g., a vector r) for each controller. This ratio is used to compute an initial power vector at each load (operation 304 of FIG. 3). It is noted that the illustrative examples of FIGS. 2 and 3 show, for example, one global constraint and the calculation and use of one Lagrange multiplier (i.e., global optimization variable), the present disclosure includes instances of applications, contexts, and use-cases of one or more global constraint and one or more Lagrange multipliers (i.e., global optimization variables).

Once initialized, the communications represented by labeled arrows three (3) and four (4) in FIG. 2, and the operations 306, 308, 310, 312 and 314 of FIG. 3 are performed iteratively. At operation 306, each controller solves the search direction for the local nonlinear programming problem as described below. As a side product, a set of data comprising load-specific information (a dataset in condensed form, e.g., as scalars or vectors) is also generated and sent to the secure, distributed transaction ledger 116 (arrow three (3) in FIG. 2, operation 308 in FIG. 3).

At the secure, distributed transaction ledger, at operation 310, using the data collected from the nodes and the commanded power profile from the independent service operator, the shared Lagrange multiplier is calculated, along with a step size. If convergence to the desired, defined (i.e., commanded) level is not yet achieved (operation 312), the calculated Lagrange multiplier and step size is sent to the nodes (arrow four (3) in FIG. 2 and operation 314 in FIG. 3).

Using the new value of the calculated Lagrange multiplier (or other global quantity), a new search direction and an updated dataset is calculated by iteratively returning to step 306. The updated dataset is sent from the controller to the secure, distributed transaction ledger (arrow three (3) in FIG. 2 and operation 308 in FIG. 3). The secure, distributed transaction ledger computation at operation 310 and the broadcast to the nodes at operation 314 is repeated and so on, until the convergence is detected at operation 312. Note that intermediate values during the iterative process (e.g., after the initial value and before convergence) might not actually be implemented by a node. For example, a node (e.g., a DER controller) might make five intermediate steps prior to convergence at a final value. In this case, the intermediate values may exist only the node's memory storage (e.g., RAM). Only after the final value is determined (e.g., sufficient convergence occurs) will the node actually implement that value locally (e.g., setting a power consumption or production level for the node, as appropriate).

Turning to additional details, in one or more implementations, the distributed optimal control technology uses an algorithm based on a distributed computation of the Newton iteration, which provides faster convergence relative to other methods (such as alternating direction method of multipliers or sub-gradient methods). As will be understood, the distributed optimal control technology exploits a structure of the problem to calculate an exact Newton step as opposed to inexact versions that require iterations to calculate the Newton direction. The technology described herein coordinates loads and distributed energy (and other) resources, and exploits their flexibilities such that the aggregated energy (or other parameter) follows the profile commanded by the ancillary services, where ancillary services may be those functionalities provided by the power grid (or other source) that support a continuous flow of power (or other objective) and work to guarantee that supply will meet demand (or otherwise satisfy the desired objective).

For each load, an optimization problem is defined essentially as a local model predictive control formulation. The cost represents local objectives, and constraints are determined by dynamics and other operational and Quality of Service ("QoS") constraint or constraints on states and inputs of the systems; e.g., temperate comfort interval may be a QoS constraint. The power tracking constraint is generally the only system-level constraint that couples the local subsystem-level optimization problems. Hence, it leads to a global optimization problem whose solution meets local objectives and constraints, and at the same time provides total power that follows the power profile demanded by the ancillary services. In an example context of an IPPTMS, the Model Predictive Controller (e.g., 202 (x), FIG. 2) may determine, for example, the amount of thrust, power generation, and cooling capacity required to achieve mission objectives while minimizing fuel burn (i.e., maximizing range of an aircraft).

Defined herein is a global optimization problem, along with an algorithm that is scalable and can efficiently solve the problem in a distributed manner. The solution calculates an optimization step (e.g., exact Newton steps) and step size in a distributed fashion in the sense that at the load, load-level information related to the step size is calculated and sent to the secure, distributed transaction ledger, and at the secure, distributed transaction ledger level, the step size is calculated using that information (i.e., load-level information related to the step), so that while the solution enjoys fast convergence of Newton primal iterations, it is also scalable to a large number of sub-systems or assets (such as electrical loads, photovoltaic panels, electric vehicles, etc.).

Consider a network of electrical sub-systems and differential algebraic equations as represented by a set $\mathcal{L}=\{L_1, \ldots, L_N\}$. For each load there are states and inputs that define the dynamic of the load that are usually defined by a set of differential algebraic equations. Differential algebraic equations are converted to discrete time equations to construct equality constraints for numerical optimization. Constraints on inputs or state form another set of equality and inequality constraints. The local optimization problem that formulates model predictive control for the load $L_i \in \mathcal{L}$ is characterized as $$\min_{X_i} f_i(X_i) \quad (1)$$
$$\text{s.t. } g_i(x_i) \leq 0$$
$$h_i(X_i) = 0$$
$$P_i = m_i(X_i)$$

where $X_i$ is the vector containing states, inputs and algebraic variables over the prediction horizon; $f_i$ is the local cost function of the optimization problem; $h_i$ and $g_i$ are the functions characterizing equality constraint containing discrete-time dynamics and other constraints imposed due to physics or stability of the load. $P_i$ is the vector representing the power dispatched over the prediction horizon and $m_i$ is the map from $X_i$ to $P_i$. The power tracking constraint $$P_d = \sum_{i=1}^{N} P_i \qquad (2)$$

is imposed to make the aggregated power follow the target power $P_d$, where $P_d$ is the vector containing the desired power profile over the prediction horizon. Local optimization problems subject to the global constraint construct the following optimization problem:

$$\min_{\{X_i, i=1,\ldots,N\}} \sum_i f_i(X_i) \qquad (3a)$$

$$\text{such that } g_i(x_i) \leq 0 \qquad (3b)$$

$$h_i(X_i) = 0 \qquad (3c)$$

$$P_i = m_i(X_i) \qquad (3d)$$

$$P_d = \sum_{i=1}^{N} P_i \qquad (3e)$$

The optimization problem defines a global model predictive control framework where the problem is solved iteratively to determine an optimal control sequence for each load such that the control sequence optimizes the local objective subject to local dynamics and constraints, while the aggregated dispatched power by the loads track the desired power profile determined by any ancillary services. The first element of the optimal control sequence for each load is implemented at each sample time.

As described herein, an assumption is that the functions $g_i$, $h_i$ and $m_i$ are linear and the functions $f_i$, are self-concordant. The problem may be reformulated to one with only an equality constraint by introducing a non-negative slack vector $S_i \geq 0$ such that $g_i(X_i) + S_i = 0$, and logarithmic barrier functions of slack variables. Then define $Y_i := [X_i^T, S_i^T]^T$, $E(Y_i) := [(g_i(X_i) + S_i^T)], (h_i(X_i))^T$, $M_i(Y_i) := m_i(X_i)$ and $F_i(Y_i, \mu) := f_i(X_i) + \mu(br(S_i))$ where the barrier function of the vector $S_i$, $br(S_i)$, is defined as $br(S_i) = \log S_j^i$, wherein $S_i = S_i^1, \ldots, S_i^{|S_i|}$, $|S_i|$ is the dimension of the vector $S_i$, and $\mu \leq 1$ is the positive coefficient of the barrier functions. Because $E_i$ and $M_i$ are affine functions they can be written as $E_i(Y_i) = A_i Y_i - b_i$ and $M_i(Y_i) = C_i Y_i - d_i$. Hence, the problem is in the following form:

$$\min_{\{Y_i, i=1,\ldots,N\}} \sum_i f_i(Y_i) \qquad (4a)$$

$$\text{s.t. } A_i(Y_i) = b_i \qquad (4b)$$

$$P_i = C_i Y_i - d_i \qquad (4c)$$

$$P_d = \sum_{i=1}^{N} P_i \qquad (4d)$$

An assumption is that the matrix $[A_i^T, C_i^T]^T$ is full row rank; it is straightforward to prove that this holds for large class of systems, if in the subsystem $L_i$, the power is an input of the system and (eq. 3c) represents the linear dynamic of the system.

Moreover, let $J(Y) := \Sigma_i F_i(Y_i)$ where. J denotes the objective function and Y is the concatenation of $Y_i, i=1, \ldots, N$. The matrices and vectors A, b, C and d are defined with appropriate dimensions such that $AY-b$ and $P_d = CY+d$ represent the equality constraints.

Therefore, the optimization problem may be written as $$\min_Y J(Y) \qquad (5a)$$

$$\text{such that } AY = b \qquad (5b)$$

$$P_d = CY + d \qquad (5c)$$

Described herein is a distributed optimization scheme or framework to solve the above optimization problem. The scheme or framework disclosed herein is based on the equality constrained Newton method, where the Newton direction and step size are calculated in a distributed fashion using data communication between a secure, distributed transaction ledger and the loads (or other controllable components).

Define $\{Y^k\}$ as the sequence of primal vectors and $\{\lambda^k\}$ the sequence of dual variables associated with constraints (eq. 5b), and $\{\rho^k\}$ the sequence of dual variables associated with the power balance constraint (eq. 5c), generated by Newton iterations. The algorithm updates the sequence of primal vectors by $$Y^{k+1} = Y^k + \alpha_k \Delta Y^k \qquad (6)$$

where $0 \leq \alpha_k \leq 1$ and $\Delta Y^k$ is the Newton search direction given by $$H^k \Delta Y^k + A^T \lambda + C^T \beta = -\nabla_Y J(Y^k) \qquad (7)$$

where $H^k := \nabla^2 J(Y^k)$. It is desired to solve (eq. 7) in a distributed fashion that is scalable such that it can be deployed for very large number of loads. To this end, described herein is exploiting the special sparsity of the problem to explicitly calculate the search direction. The following theorem enables the development of a distributed iterative algorithm to the calculate Newton search direction.

Assume the optimization problem set forth above is strictly feasible. Given primal vectors $Y_i$, $i=1, \ldots, N$, the Lagrange multiplier associated with the power tracking constraint (5c) is set forth in (7) is given by $$\rho^k = -\Gamma^{k-1} r_p^k \qquad (8)$$

where $$\Gamma^k := \sum_{i=1}^{N} [C_i \; 0](K_i^k)^{-1} \begin{bmatrix} C_i^T \\ 0 \end{bmatrix}, \qquad (9)$$

$$r_p^k := \sum_{i=1}^{N} [C_i \; 0](K_i^k)^{-1} \begin{bmatrix} \nabla_{Y_i} F_i(Y_i) \\ 0 \end{bmatrix}, \qquad (10)$$

and $$K_i^k := \begin{bmatrix} H_i^k & A_i^T \\ A_i & 0 \end{bmatrix}$$

is the local KKT (Karush-Kuhn-Tucker) matrix. Moreover, $\Delta Y_i^k$ and $\lambda_i^k$ are calculated as $$\begin{bmatrix} \Delta Y_i^k \\ \lambda_i^k \end{bmatrix} = -(K_i^k)^{-1} \begin{bmatrix} C_i^T \\ 0 \end{bmatrix} \rho^k - (K_i^k)^{-1} \begin{bmatrix} \nabla_{Y_i} F_i(Y_i) \\ 0 \end{bmatrix}, \quad (11)$$

where the matrix and vector 0 are with appropriate dimensions.

To be able to implement primal vector update (eq. 6), the value of $\alpha_k$ needs to be calculated. The step size is determined by the Newton decrement (ND), defined as $$ND(Y^k) := \sqrt{\Delta Y_k^T H_k \Delta Y_k}. \quad (12)$$

ND can be written in terms of local information $Y_i^k$ as $$ND(Y^k) = \sqrt{\sum_i \Delta Y_i^{k^T} H_i^k \Delta Y_i^k} \quad (13)$$

The step size $\alpha_k$ then is calculated as a function of ND as follows:

$$\alpha_k = \begin{cases} \dfrac{1}{ND(Y^k)+1} & \text{if } ND(Y^k) \geq 1 \\ 1 & \text{otherwise} \end{cases} \quad (14)$$

Because the cost function J(Y) is self-concordant and the constraints are linear, the step size calculated according to (eq. 14) provides linear and then quadratic convergence to the optimal solution in two stages. Described herein is a method or process of having the Newton direction $Y^k$ and step size $\alpha_k$ calculated in a distributed fashion at the secure, distributed transaction ledger using the data gathered by communication between the secure, distributed transaction ledger and loads.

FIGS. 1 and 2 describe the communication structure of the secure, distributed transaction ledger and nodes through which the Newton direction and step size are calculated. In one or more implementations, as described in FIG. 3, the operations occur in two general stages. A first stage is feasible initialization, described herein with reference to the example flow diagrams of FIG. 4 (the secure, distributed transaction ledger initialization-related operations) and FIG. 6 (the controller initialization-related operations), where each load is initialized by the power that is locally feasible and satisfies the power balance constraint (eq. 5c). A second stage includes optimization iterations, described herein with reference to the example flow diagrams of FIG. 5 (the secure, distributed transaction ledger optimization-related operations) and FIG. 7 (the controller optimization-related operations).

Figure 4:
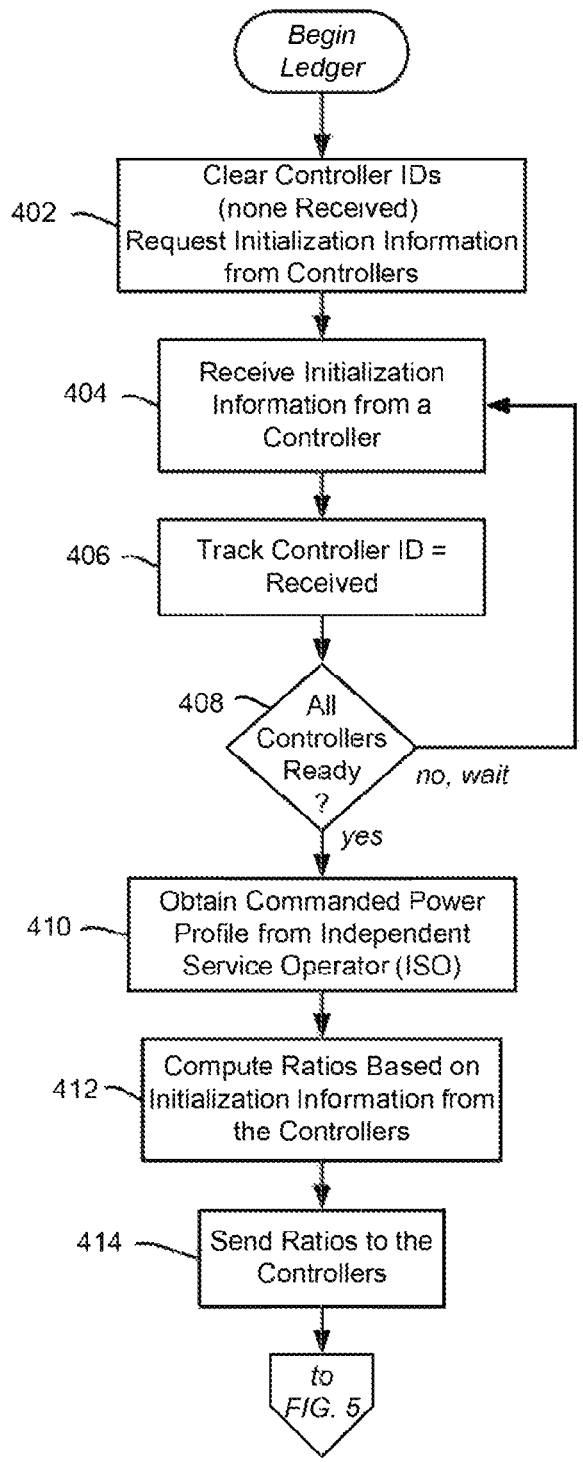
FIGS. 4 and 5 comprise a flow diagram showing example operations of a secure, distributed transaction ledger, according to one or more example implementations.
Figure 6:
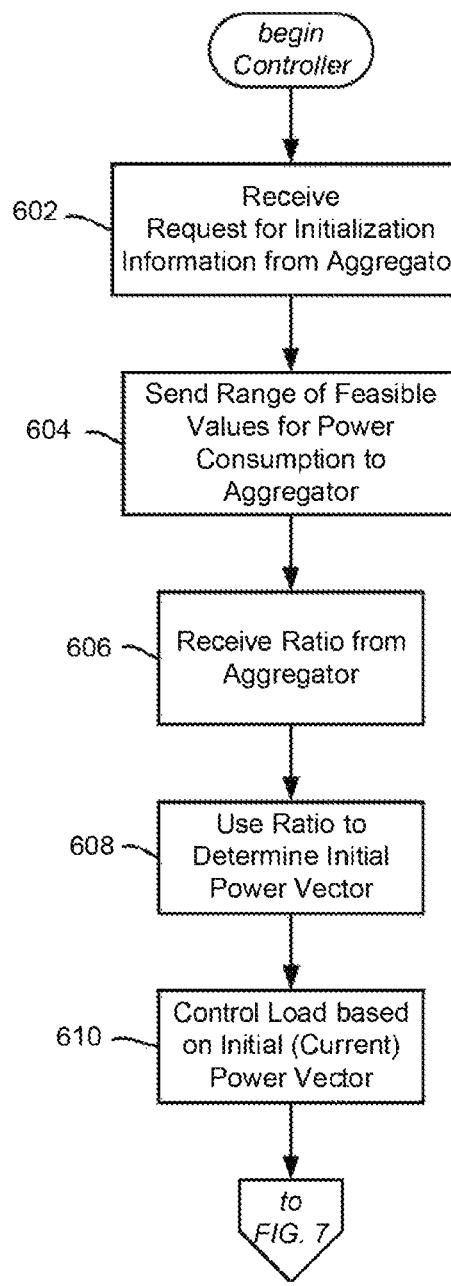
FIGS. 6 and 7 comprise a flow diagram showing example operations of a per-load distributed controller, according to one or more example implementations.

The initialization phase may, in one or more implementations, be started by the secure, distributed transaction ledger initializing itself and requesting that each controller provide power (or other parameter) feasible information (operation 402 of FIG. 4 and operation 602 of FIG. 6).

For each load $L_i \in \mathcal{L}$, a range (interval) $[p_{min}{}^i, p_{max}{}^i]$ is assumed which defines the feasible values for power consumption. Hence, each of the loads sends its respective upper and lower limit of the power (or other parameter) feasible range to the secure, distributed transaction ledger (operation 604 of FIG. 6).

Operations 404, 406 and 408 of FIG. 4 represent collecting the initial range information from each of the controllers. When the range information is received at the secure, distributed transaction ledger from the controllers, $P_{min} = \Sigma_i p_{min}{}^i$ and $P_{max} = \Sigma_i p_{max}{}^i$ are calculated; (note that it is feasible to begin summing before each of the controllers has responded). Further note that if the desired values of some elements of $P_d$ do not belong to $[P_{min}, P_{max}]$ then the constraint (eq. 5c) is not feasible. Otherwise, assuming $p_d{}^j$ being the j-th element of $P_d$, the ratio vector r is calculated as $$r_j := \frac{p_d^j - P_{min}}{P_{max} - P_{min}}$$

where $r_j$ is the j-th element of r. The value of r is then sent to the controllers, which may differ per controller. Note that the value of r corresponds to the target power obtained from the independent service operator, (operation 410), which may be obtained independently at any suitable time before the ratios are computed and sent (operations 412 and 414).

When the ratio vector is received by a controller (operation 606 of FIG. 6), at each load $L_i$, the power vector $P_i$ is initialized by setting the j-th element of it as $P_i^j = p_{min}{}^i + r_j (P_{max}{}^i - P_{min}{}^i)$ (operation 608 of FIG. 6). The controlling of the load based upon this initial power (or other parameter) vector (which is the current power vector at this time) is represented by operation 610 of FIG. 6.

It can be easily shown that the sequence $\{P_i\}$ provides feasible power vectors for the loads $L_i \in \mathcal{L}$ and it satisfies the constraint eq. 5c.

Figure 5:
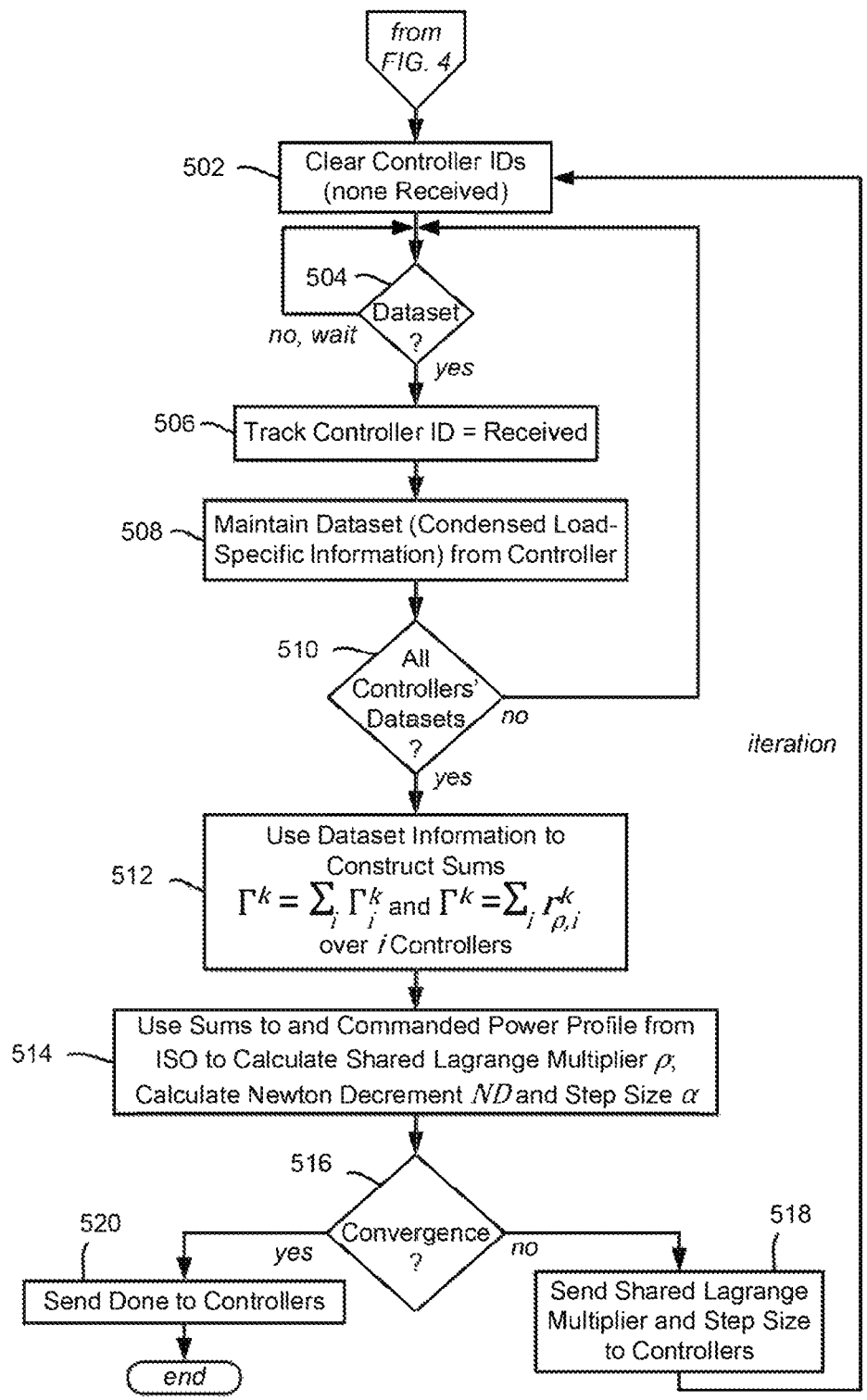
Figure 7:
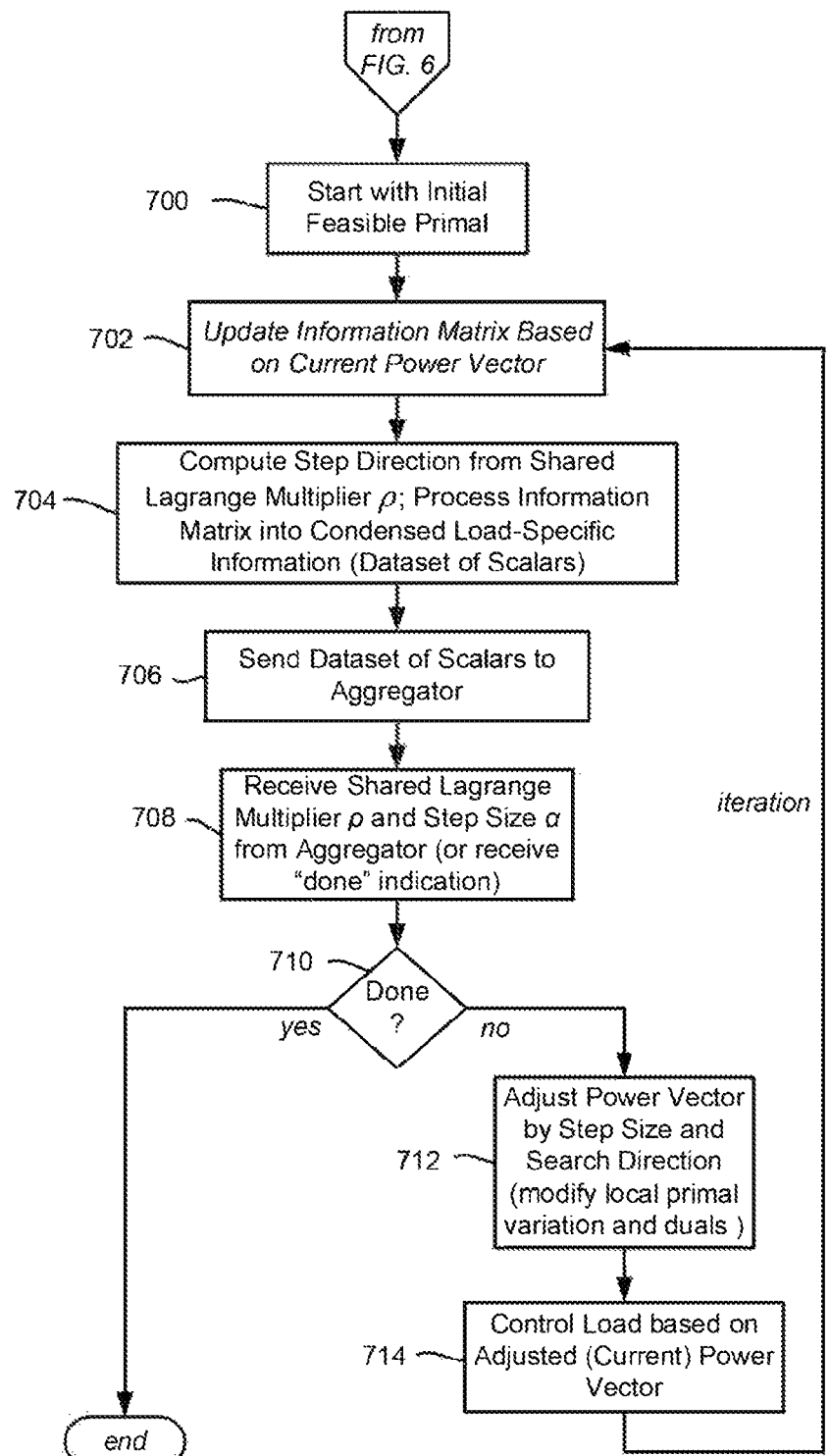

The optimization phase is described herein with reference to the example flow diagrams of FIG. 5 (for the secure, distributed transaction ledger optimization-related operations) and FIG. 7 (for the controller optimization-related operations). For example, the secure, distributed transaction ledger clears its tracking information (that assures each controller reports its data) and waits for the controllers to begin sending their datasets until each is received, as represented by operations 502, 504, 506 and 508 of FIG. 5. It is noted that the illustrative examples of FIGS. 5 and 7 show, for example, one global constraint and the calculation and use of one Lagrange multiplier (i.e., global optimization variable). However, the present disclosure includes instances of applications, contexts, and use-cases of one or more global constraint and one or more Lagrange multipliers (i.e., global optimization variables).

Each controller starts with its own initial feasible primal $Y^0$ (e.g., operation 700 of FIG. 7, not part of the iteration operations 702-714). Note that operation 702 represents updating the information matrix for a respective node, which may occur independent of any controller operations, e.g., as the power (or other parameter) vector changes.

At each load $L_i$, operation 704 is performed, which calculates the step direction and also generates the scalars or vectors that represent the information matrix in condensed form, e.g., $\delta_i^k, r_{\rho,i}^k, a_i^k := \Delta Y_{i,\rho}^{k^T} H_i^k \Delta Y_{i,\rho}^k, b_i^k := \Delta Y_{i,\rho}^{k^T} H_i^k \Delta Y_{i,0}^k$ and $c_i^k := \Delta Y_{i,0}^{k^T} H_i^k \Delta Y_{i,0}^k$ where $$\Gamma_i^k := [C_i \; 0](K_i^k)^{-1} \begin{bmatrix} C_i^T \\ 0 \end{bmatrix}$$

(a surrogate for sensitivity of power with respect to in Lagrange multiplier ρ;

$$r_{\rho,i}^k := [C_i \ 0](K_i^k)^{-1} \begin{bmatrix} \nabla_{Y_i} F_i(Y_i) \\ 0 \end{bmatrix}$$

(representing the optimal change of power once $\rho=0$);
$\Delta Y_{i,o}^k := [I \ 0](K_i^k)^{-1} \begin{bmatrix} 0 \\ C_i^T \end{bmatrix}$; (representing the sensitivity of the local search direction with respect to $\rho$);

$$\Delta Y_{i,\rho}^k := [I \ 0](K_i^k)^{-1} \begin{bmatrix} \nabla_{Y_i} F_i(Y_i) \\ 0 \end{bmatrix}$$

(representing the local search direction once $\rho=0$.

These per-node dependent values are sent to the secure, distributed transaction ledger by each controller at operation 706 of FIG. 7.

The secure, distributed transaction ledger, as represented by operation 512 of FIG. 5, constructs $\Gamma^k = \Sigma_i \Gamma_i^k$ and $r_\rho^k = \Sigma_i r_{\rho,i}^k$, note that the summations may begin before each controller has reported its dataset. The secure, distributed transaction ledger, as represented by operation 514 of FIG. 5, calculates $\rho^k$ using (eq. 8), calculates the Newton decrement, ND $(Y^k) = \Sigma_i (a_i^k \rho^{k^2} + 2b_i^k \rho^k + c_i^k)$, and calculates $\alpha_k$ according to (15). If the value of ND $(Y^k)$ is sufficiently small, as based upon a predefined convergence level, operation 516 terminates the iterations. Otherwise, operation 518 sends $\rho^k$ and $\alpha_k$ to the controllers.

At each controller, if $\rho^k$ and $\alpha_k$ are received (operations 708 and 710 of FIG. 7), the received $\rho^k$ and $\alpha_k$ are used to calculate the local primal variation and duals according to (eq. 11) and update the primal according to (eq. 6); (e.g., operation 712 of FIG. 7). This changes the power control of the load, as illustrated at operation 714 in FIG. 7. Note that operation 710 represents receiving a "done" indication from the secure, distributed transaction ledger, which is not strictly necessary if operation 708 does not receive anything further (i.e., no updated $\rho^k$ and $\alpha_k$ are received at operation 708), until operation 602 restarts the next controller initialization.

Turning to another aspect, some loads might have discrete power consumption, that is, they are either on or off (in contrast to loads that accept continuous values for power control). Described herein is an algorithm that can handle loads that only accept boundary values of the power feasible interval (assuming the interval is the range from minimum to maximum). Thus, the power only accepts discrete values, e.g., $p_i \in \{p_{min}^i, p_{max}^i\}$ for the loads $L_i \in \mathcal{L}_d \subset \mathcal{L}$. A general goal here is to avoid mixed-integer programming, which is often not suitable for real time optimization, especially for large scale problems.

To this end, the optimization problem is first solved according to the algorithm assuming all the loads accept continuous values for power within the feasible interval. Let $\{\overline{P}_i\}$ be the sequence of optimal power vectors and $P_{dsc} := \Sigma_{L_i \in \mathcal{L}_d} \overline{P}_i$ be the power consumed by loads with discrete power consumption. Further, let $N_{dsc} = |\mathcal{L}_d|$ be number of the loads with discrete power input. The following algorithm turns the value of elements of $\overline{P}_i$ to $p_{max}^i$ of $p_{min}^i$ so that the desired power $P_d$ is tracked as close as possible while the power values closer to maximum have higher priority to be switched to $p_{max}^i$.

Figure 8:
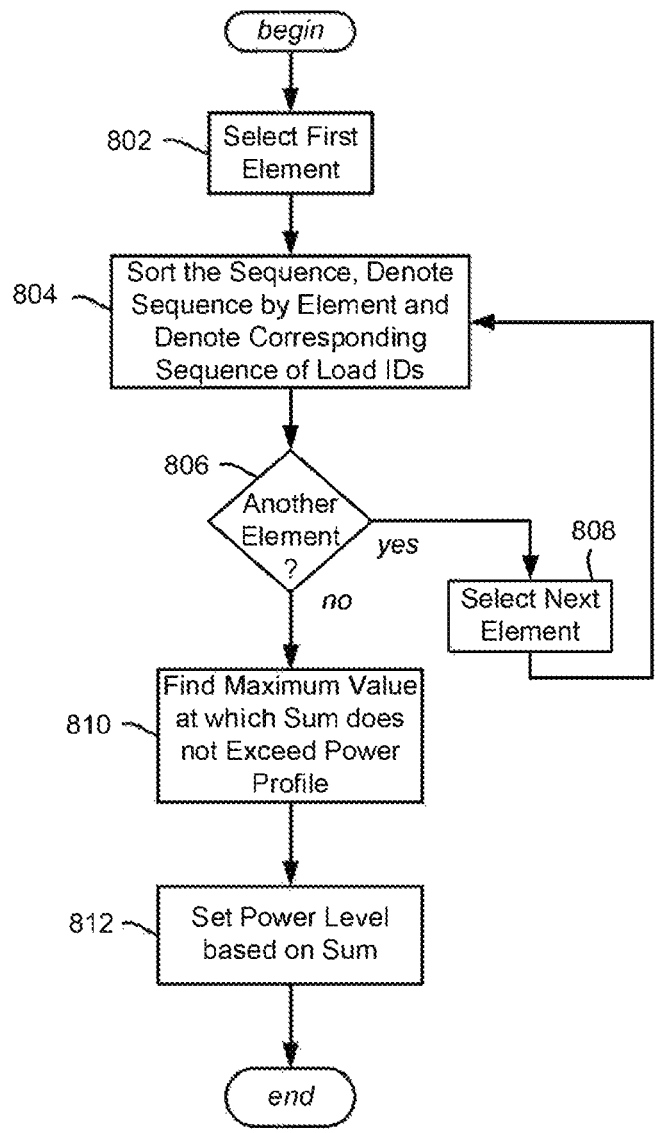
FIG. 8 is a flow diagram showing example operations for controlling a discrete load, according to one or more example implementations.

Referring to FIG. 8, via operations 802, 806 and 808, for each element j, which represents the j-th step in the prediction horizon, operation 804 sorts the sequence $$\left\{ \frac{p_{max}^i - \overline{P}_i^j}{p_{max}^i - p_{min}^i} \right\}$$

and denotes it by $\{\hat{P}_i^j\}$. Also, operation 804 denotes the corresponding sequence of the load numbers by I.

Operation 810 finds the maximum value of $n_j$ such that $\Sigma_{i=1}^{n_j} p_{max}^{I_i} \leq p_d^j$. Operation 812 sets $P_{I_k}^j = p_{max}^{I_k}$, for $k=1, \ldots, n_j$ and sets the rest to $p_{max}^{I_k}$.

Combining the disclosed continuous load optimization with the above-described discrete load post-processing allows the technology disclosed herein to handle any mixture of continuous and discrete loads. The effectiveness of the disclosed distributed optimal control scheme or framework herein may be demonstrated via a numerical simulation, e.g., considering 100 buildings as the distributed loads. In this example, each building is individually controlled by its own HVAC control system. Each building may have single or multiple Roof Top Units ("RTUs") managed by a single controller, or multiple controllers through a Building Management System ("BMS"). Each building communicates with a secure, distributed transaction ledger, e.g., via a controller, as described herein. As described herein, a main job of the distributed optimal controller in this example is to compute power (or other parameter) set points to each building (or other component) such that the sum of powers (or other parameter) consumed by the buildings (or other components) track the power (or other parameter) set point commanded by the grid Independent Service Operator ("ISO") (or other parameter command source), while keeping each building (or other component) temperature (or other parameter) within the defined comfort zone (or other constraint(s)) to the extent possible. Referring to the present example of 100 buildings as the distributed loads, the thermal dynamics of the i-th building may be modeled using an equivalent RC circuit, as:

$$C_i \frac{d\tau_i}{dt} = -\frac{\tau_i - \tau_i^0}{R_i} - P_i, \quad (16)$$

where $P_i$ is the input power, $\tau_i^0$ is the ambient temperature [80° F.], $R_i$ is the thermal resistance [2.5° C./kW], $C_i$ is the thermal capacitance [1.5 kW h/° C.] and $P_{max_i}$ is the maximum power consumption [7.2 kW]. It is noted that for other types of loads or components, the corresponding model would be modified and/or designed appropriately to accurately model the characteristic behavior for the particular load, sub-system, or component.

The above parameters represent a nominal load model. The load parameters may be stochastically perturbed to account for model uncertainties in different buildings. At the abstraction level from the secure, distributed transaction ledger's perspective, this RC model captures the building dynamics well, while keeping the computations tractable for a larger number of loads. It can be reasonably assumed that the dynamics of the HVAC controller is much faster than the thermal dynamics of the building and can be neglected in this context. Further, assume the loads are of the same dynamic time scale and that the communication delays between loads and the secure, distributed transaction ledger are negligible. In some embodiments, use-cases, and contexts, similar assumptions might made for other sub-systems and components. While older buildings have ON-OFF HVAC controllers, thus making them a discrete load, most newer buildings are equipped with either Variable Air Volume ("VAV") handling, or electronic expansion valves in the HVAC refrigeration cycle, making them a continuously controllable load. For continuous loads, the power set point at each instant can be any number between 0 and $P_{max}$. For discrete loads, the power at each instant is either 0 (OFF mode) or $P_{max}$ (ON mode), and there is also a hysteresis mechanism, such as with the minimum on and off times as follows:

MIN-OFF-TIME=4 mins

MIN-ON-TIME=6 mins, which means that once the HVAC is OFF is remains OFF for at least 4 minutes, and once it is turned ON, it remains ON for at least 6 minutes. In order to accommodate both newer and older buildings, in these example simulations, fifty loads are randomly selected as continuous and the remaining fifty loads as discrete. The loads are simulated with random and different initial temperatures. The thermal comfort zone is defined to be between 75° F. and 79° F. and is penalized using a log barrier in the optimization overall cost function. A load is referred to as "active" if the load is available for control. Continuous loads are virtually always available, while discrete loads are only available if their status is changeable, i.e. they are not within their time hysteresis region.

At each time step, an interior point optimization problem is solved in a distributed fashion, as described herein. In each iteration of the optimization, the secure, distributed transaction ledger waits until it receives information from all loads, computes ρ and broadcasts back to all loads. The potential time differences between each load to complete one iteration of the optimization is negligible compared to the time scale of the load dynamics. Thus, during the potential wait time of the secure, distributed transaction ledger, the load temperatures remain almost constant. To put this into context, one iteration of the optimization problem may take a fraction of a second, while the thermal time constant of a building is typically several minutes up to a few hours. In some embodiments, use-cases, and contexts, similar assumptions might made for other optimization problem applications.

Figure 9:
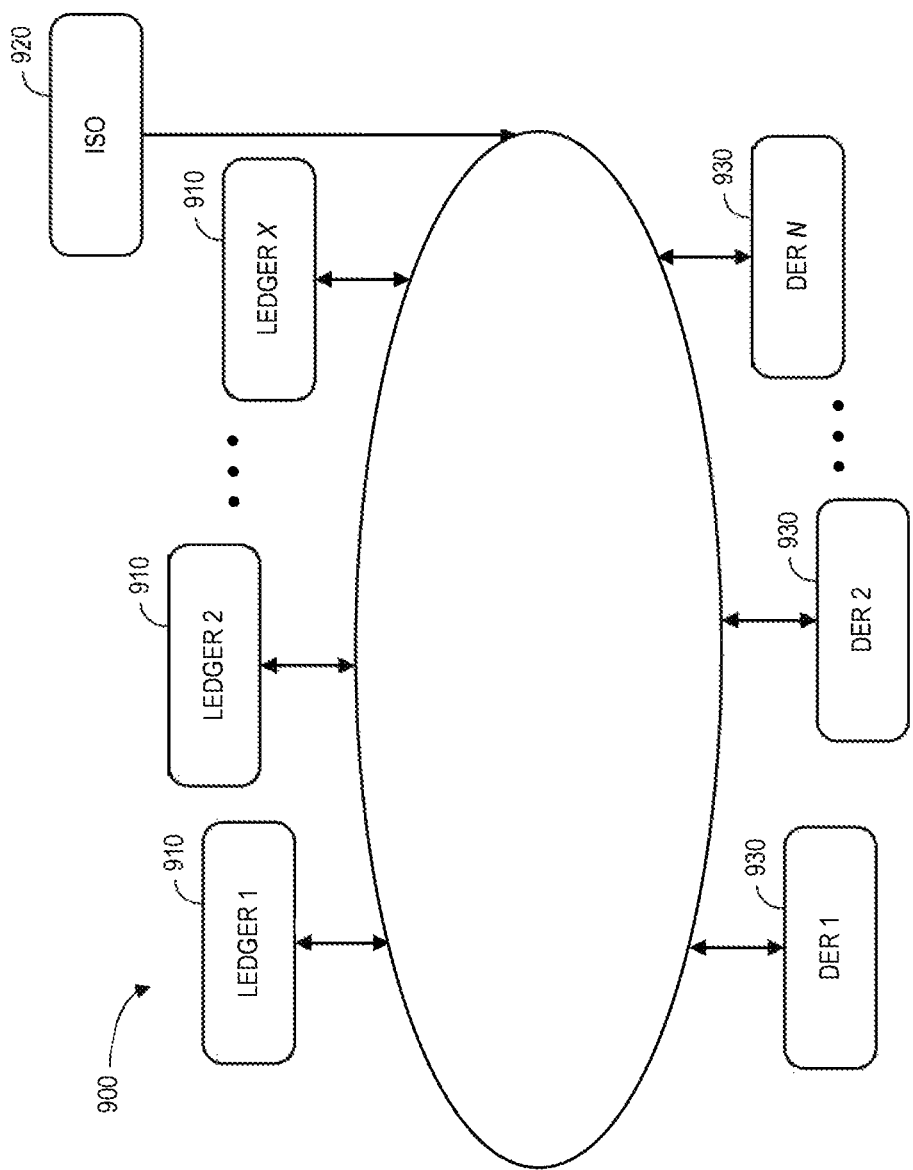
FIG. 9 illustrates a communication structure of loads connected to a blockchain network.

Some embodiments described herein may reduce the cost of enablement by introducing a blockchain-based distributed optimization algorithm. Using blockchain technology, loads and blockchain agents (ledgers) may exchange information such that loads perform primal iterations and the ledgers calculate dual variables corresponding to coupling constraints including power balance constraint. For example, FIG. 9 illustrates a communication structure 900 including a number of DERs 930 (DERs 1 through N as illustrated in FIG. 9) (or other controllable components) connected to a blockchain network having a number of secure, distributed transaction ledgers 910 (ledgers 1 through X as illustrated in FIG. 9). According to some embodiments, an ISO 920 may also provide information to be utilized by the system. The ledgers 910 may exchange information with DERs 930 (or other controllable components) to provide scalable, flexible control of distributed DERs (or other controllable components) in a power grid (or other system).

Employing DER flexibility for so many small participants may require new technology—control algorithm and cloud computing—to reduce the otherwise high cost of enablement. Embodiments described herein use blockchain based optimization technology that reduces the cost of enablement, hence making the use and flexibility of a substantial number of small DERs, e.g., residential buildings, feasible.

The blockchain-based distributed optimization scheme may be associated with a network structure where a substantial number of DERs (or other controllable components or sub-systems) can plug in and optimally be controlled in a distributed fashion such that they cooperatively provide a desired total power (or one or more other parameters) consumption determined by the ISO while ensuring that local constraints are met. Blockchain technology provides for easy communication from the DERs (or other controllable sub-systems or components) to the blockchain cloud along with cheap, distributed computation power enabled by ledgers. The control actions of DERs (or other controllable sub-systems or components) are determined by real-time optimization where iteration calculations are performed at the DER (or other sub-system or controllable component) level and by ledgers distributed in the network. Once the optimization iterations converge, the resulting optimal control action is implemented by each DER (or other controllable sub-system or component). Embodiments may remove the need for any central coordinator among DERs (or other controllable sub-system or component) at any layer and therefore reduce the cost of enablement to recruit a large number of small participants. Moreover, the computational cost of the algorithm is distributed among DERs (or other controllable sub-systems or components) and ledgers, making real-time optimization feasible. The technology might be used, for example, to create an army of blockchain-enabled small DERs that are equipped with an edge optimization algorithm connected to blockchain network. This army of small DERs cooperatively can provide significant DER flexibility for the grid with low enablement cost. Key entities in the disclosed technology include the distributed optimal control algorithm designed to use blockchain for optimization iterations and a fast blockchain theory that enables real-time implementation of the optimal control algorithm, where the disclosed technology improvements disclosed herein may be applied to a number of different applications and use-contexts.

According to some embodiments, a distributed optimal control algorithm solves the MPC problem that minimizes the aggregated cost of all DERs (or other controllable sub-systems or components) subject to their local constraints and a collective demand constraint. In particular, some embodiments may enjoy relatively fast quadratic convergence. Moreover, the structure does not require a single aggregator at one layer (or different layers) to collect information from DERs (or other controllable sub-systems or components) and return updated values of Lagrange multipliers to the DERs (or other controllable sub-systems or components) at each optimization iteration. Instead, embodiments may use blockchain technology (including smart contracts) to remove the need for aggregators at different layers and thus reduce the cost of enablement. Embodiments may provide system resilience while still enabling substantially real-time control because of the relatively fast convergence of the optimization algorithm. Referring again to FIG. 9, DERs 930 (or other controllable sub-systems or components) perform primal calculations and share minimal necessary information with ledgers 910 to perform dual calculations, and the DERs 930 (or other controllable sub-systems or components) can download the results from the network and continue optimization iterations. The sub-systems or components need not reveal details regarding their identity, configuration, and/or their local constraints (e.g., power demand, thermal heat consumption, heat pumping capability, propulsion, etc.). This ability to obscure the sub-systems or components is an important benefit of the algorithm's architecture in that the details of the sub-systems or components need not be shared for the algorithm arrive at the optimal solution.

Figure 10:
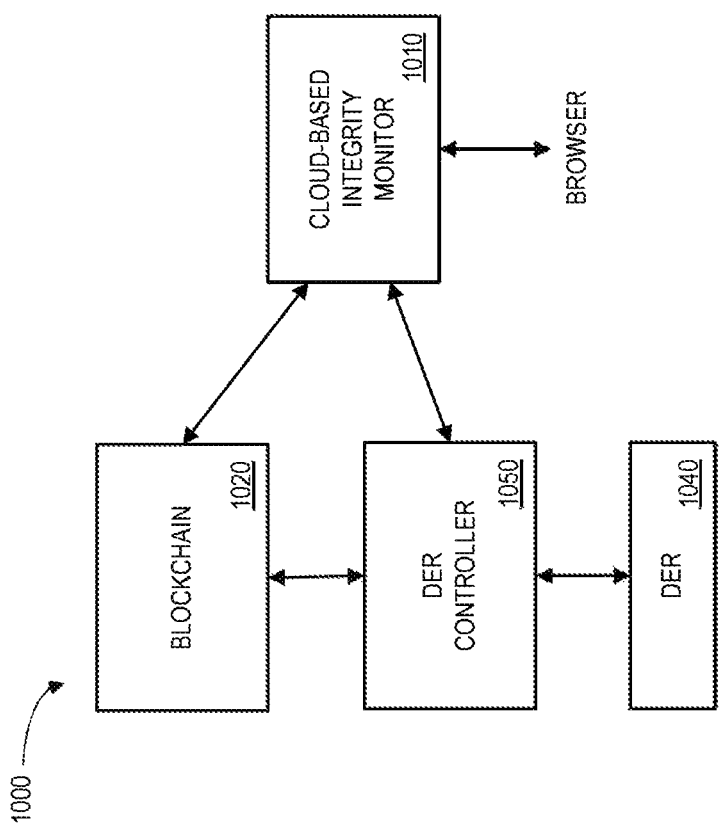
FIG. 10 is a system implementing load balancing with blockchain validation according to some embodiments.
Figure 11:
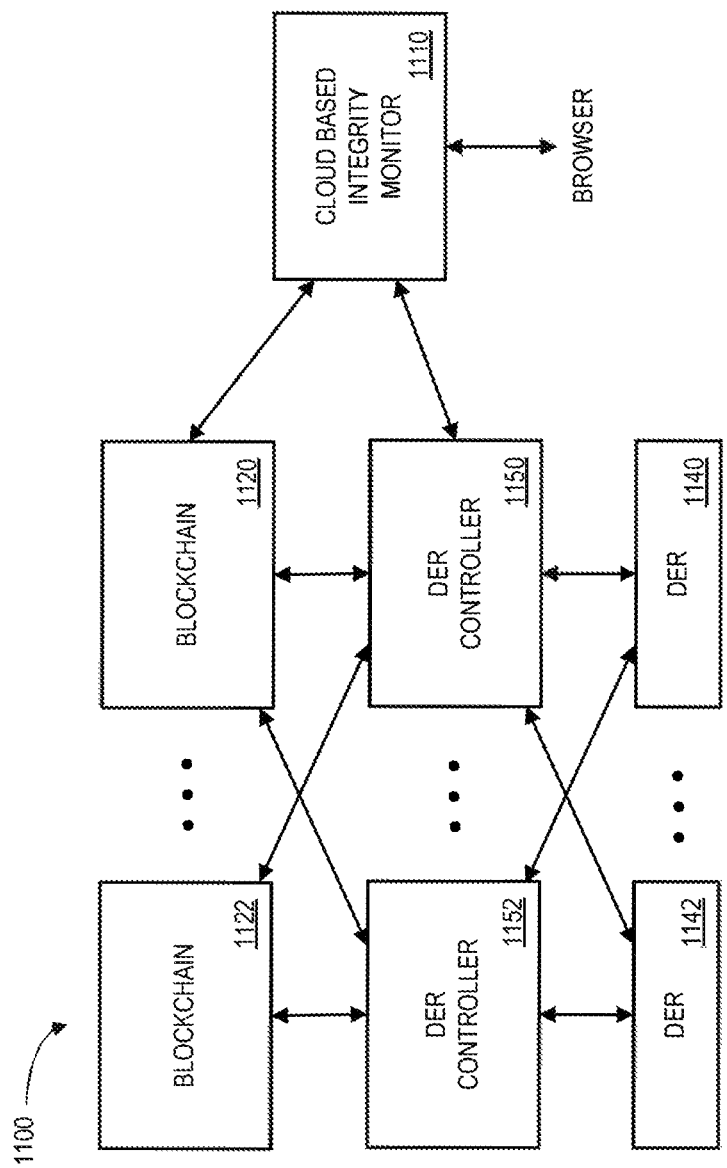
FIG. 11 is a system implementing load balancing with multiple digital transaction engines in accordance with some embodiments.

FIG. 10 is an example system 1000 implementing load balancing with blockchain validation according to some embodiments. A cloud-based integrity monitor 1010 may provide transaction integrity data via a web browser and exchange information with a blockchain 1020 and a DER (or other sub-system or component) controller 1050 via Representational State Transfer ("REST") web services. The REST web services may, for example, provide interoperability between computer systems on the Internet (e.g., by allowing requesting systems to access and manipulate textual representations of web resources using a uniform, predefined set of stateless operations). According to some embodiments, portions of the DER (or other system or component) controller 1050 may be associated with a MySQL database. In this way, the DER (or other system or component) controller 1050 and blockchain 1020 can be used to provide transaction level verification associated with a power DER (or other system or component) 1040. Although FIG. 10 illustrates a system 1000 with a single blockchain 1020 and DER (or other system or component) controller 1050, note that embodiments may employ other topologies. For example, FIG. 11 is a system 1100 implementing DER balancing incorporating multiple blockchains and DER (or other system or component) controllers in accordance with some embodiments. In particular, an additional blockchain 1122 and DER (or other system or component) controller 1152 may provide protection for associated with multiple DERs (or other system or components) 1142. As illustrated in FIG. 11, each DER (or other system or component) controller 1150, 1152 may be associated with multiple blockchains 1120, 1122 providing additional protection for the system 1100 (e.g., by storing information at multiple, geographically disperse nodes making attacks impractical). That is, each verifier (e.g., DER (or other system or component) controller 1152) may commit a brief summary to an independent data store and, once recorded, the information cannot be changed without detection to provide a tamper-proof System of Records ("SoR").

Figure 12:
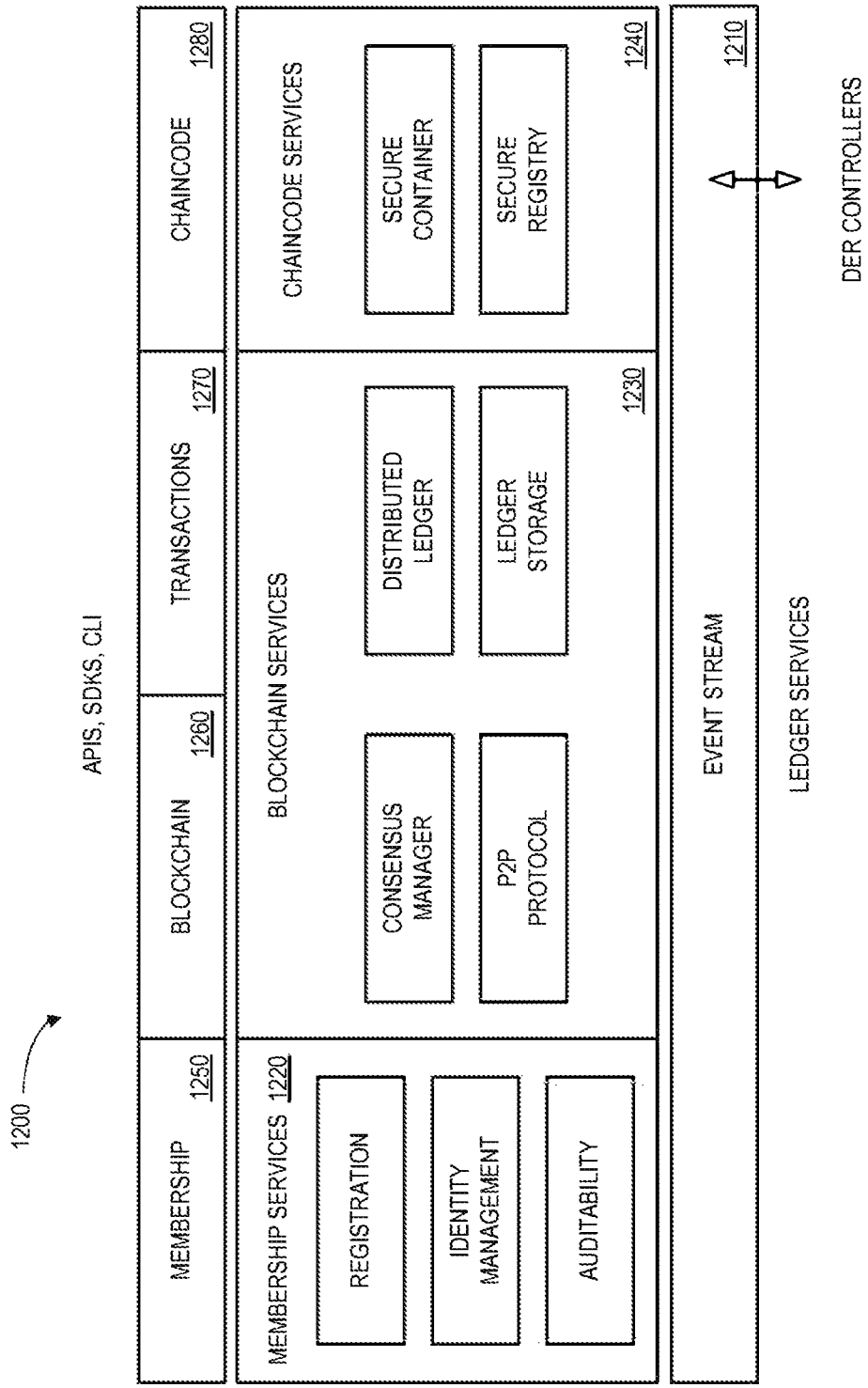
FIG. 12 is a distributed ledger reference architecture according to some embodiments.

Embodiments may be associated with any type of distributed ledger having a de-centralized consensus-based network that supports smart contracts, digital assets, record repositories, and/or cryptographic security. For example, FIG. 12 is a secure, distributed ledger reference architecture 1200 according to some embodiments. The architecture 1200 includes ledger services and an event stream 1210 that may contain network security service information (e.g., from DER (or other system or component) controllers). Membership services 1220 (e.g., including registration, identity managements, and/or an auditability process) may manage identity, privacy, and confidentially for membership 1250 for the network security service. Blockchain services (e.g., including a consensus manager, Peer-to-Peer ("P2P") protocol, a distributed ledger, and/or ledger storage) may manage the distributed ledger through a P2P protocol built on HTTP to maintain a single state that replicated at many nodes to support blockchains 1260 and transactions 1270. Chaincode services 1240 (e.g., secure container and/or a secure registry associated with a smart contract) may help compartmentalize smart contract (or chaincode 1280) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service via the reference architecture 1200.

Figure 13:
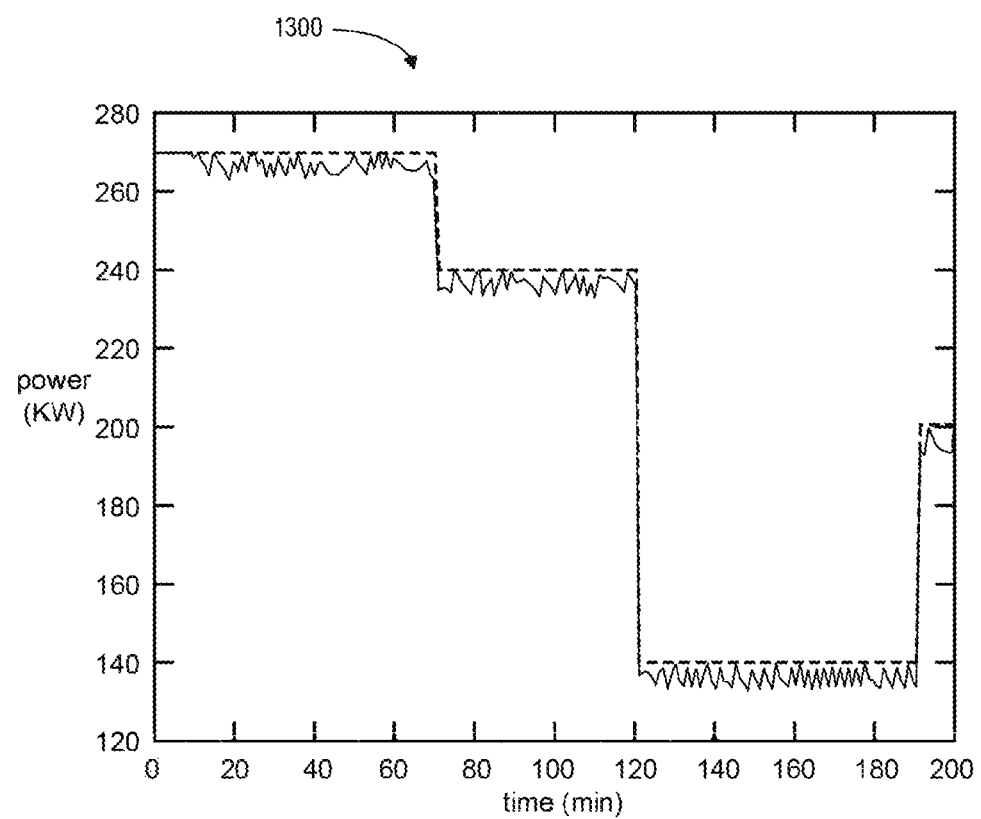
FIG. 13 is an example graph representation of a simulation demonstrating achieved power versus commanded power over time, according to one or more example implementations.

FIG. 13 shows, for a power control example in accordance with some embodiments herein, a graph 1300 of the total sum of achieved power the (solid line) versus the commanded power (dashed line) over time. If all active loads (loads available for control) are continuously controllable, the power command will be tracked virtually exactly, materializing the equality constraint (eq. 2). However, in the presence of discrete loads, exact tracking of the power commands may not be possible. Thus, the tracking depends on the number of loads of each type, the parameters of each load, and the commanded power value.

The power tracking requirement in this example case is that the total sum of building powers tracks the power command as closely as possible without exceeding the power command. In this example, at each sampling time, first assign the power of discrete loads that are not active and subtract the sum of power of such subset of loads from the overall power command to get the sum of powers that need to be matched by the active loads (which itself is a mixture of continuous and discrete loads).

After solving the optimization problem, the discrete active loads are post-processed using the algorithm described in with reference to FIG. 8. As shown in FIG. 13, the sum of load powers never exceeds the command, which is expected. The RMS value of the relative power tracking error for this simulation is 2.32%. The number of active loads and their individual power set points are automatically computed by the optimization algorithm at each sampling time. Note that at the beginning, the discrete loads are OFF, and because they have to remain OFF to fulfill the hysteresis requirement, at the first four sampling times, only the fifty continuous loads are active.

Figure 14:
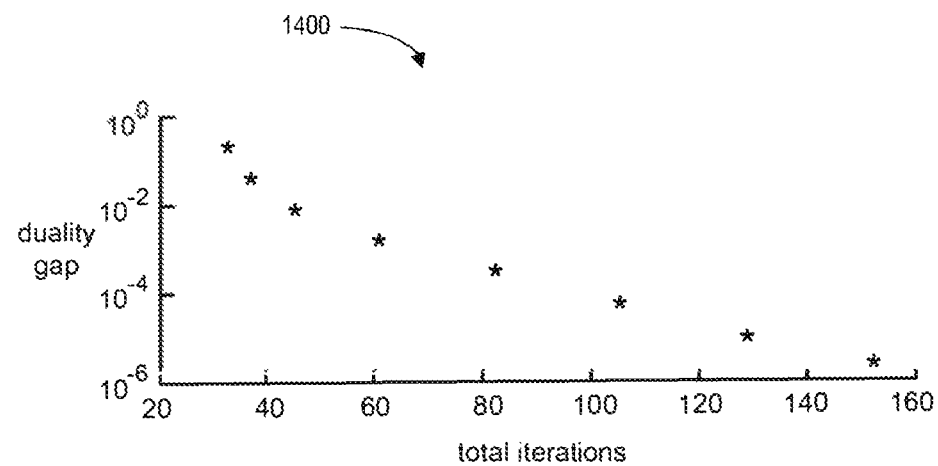
FIG. 14 is an example graph representation of optimizations' duality gap changes over a number of iterations, which may be used to determine sufficient convergence, according to one or more example implementations.
Figure 15:
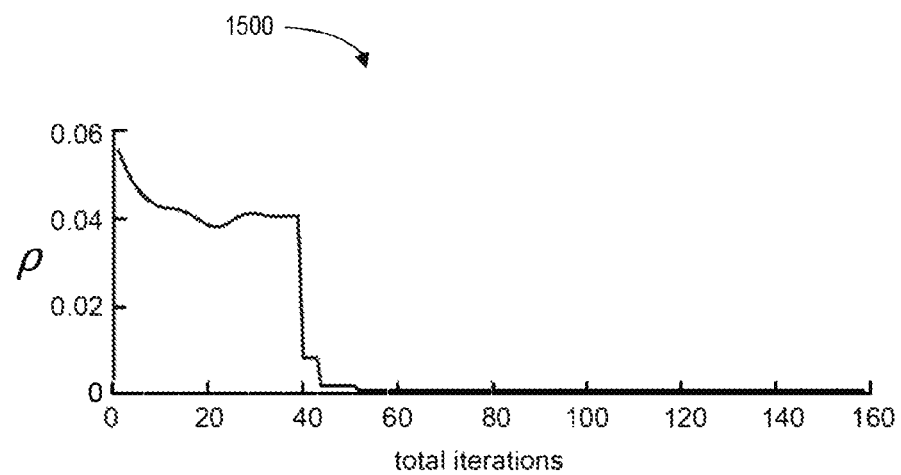
FIG. 15 is an example graph representation of optimizations' Lagrange multiplier value changes over a number of iterations, which may be used to determine sufficient convergence, according to one or more example implementations.

In terms of convergence performance for this power control example, graph 1400 of FIG. 14 illustrates convergence via the duality gap (the difference between the primal and dual solutions). In graph 1500 of FIG. 15, the values of $\rho$ (the Lagrange multiplier associated with power balance) versus the total number of iterations in an optimization problem is shown as solved within one sampling time. The convergence criterion can be established based on either the duality gap or rate of change of $\rho$, for example.

As can be seen, some embodiments may provide an optimization algorithm for cooperation of distributed flexible power resources to provide regulation and ramping reserve as an ancillary service. This may facilitate the penetration of renewable energies. The distributed iterative operations disclosed provide mechanisms to make real-time distributed optimization feasible, with the target aggregated power being achieved while not significantly impacting the local operation of the distributed flexible power resources. The scalable optimal flexibility control distributes the computational burden of large-scale optimization among loads/nodes (e.g., electrical sub-systems of an aircraft) while they communicate with the secure, distributed transaction ledger. Embodiments may be relatively efficient and may be implemented via a secure, distributed transaction ledger level with a substantial number of loads. Moreover, because functions are implemented via a secure distributed transaction ledger, embodiments may be scalable (that is, the cost and trouble of having a single entity aggregate all of the data from every load may be avoided). Moreover, the system may be secure because the transaction data is stored at multiple locations (e.g., multiple ledgers).

In addition, some embodiments described herein utilize blockchain technology (including smart contracts) to remove the need for aggregators at different layers, and thus reduce the cost of enablement of the technology and help provide both system resilience and substantially real-time control (because of the relatively fast convergence of the optimization algorithm). Embodiments may enable a plug-and-play cloud-edge configuration enabled by the control algorithm/blockchain.

One or more aspects of some embodiments herein may be directed towards, for example, a load controller of distributed load controllers, the load controller coupled to manage a power-consuming load that consumes power supplied via a consumer supply device of a power grid, wherein the load controller manages the load to satisfy the load's quality of service constraint or constraints, and wherein the load controller is communicatively coupled to a secure, distributed transaction ledger that aggregates data sent by the load controller and received from one or more other distributed load controllers of the distributed load controllers, the data comprising initial data that comprises a power range. In one or more aspects, the load controller is configured to receive an initial ratio value from the secure, distributed transaction ledger, wherein the initial ratio value is based on the power range and other power range data from the one or more other distributed load controllers of the distributed load controllers, and wherein the load controller is further configured to use the initial ratio value to set a local control action level to an initial level, and use load-specific information of the power-consuming load to determine condensed information comprising one or more scalar or vector values that represent the load-specific information in a more compact form than the load-specific information, and to communicate the condensed information to the secure, distributed transaction ledger, wherein the local control action level is local to the load controller. In one or more aspects, the load controller is further configured to perform iterations based on communication with the secure, distributed transaction ledger to update local optimization variables, including variables defining control actions, until the secure, distributed transaction ledger determines that the iterations have satisfied a defined condition, and wherein the iterations are performed to receive a step size value and a global value from the secure, distributed transaction ledger, wherein the step size value and the global value are calculated based on the condensed information and other condensed information from the one or more other distributed load controllers of the distributed load controllers, determine a step direction, control the power-consuming load with an adjustment based on the step size value and the step direction to approach optimal control values satisfying the specified aggregated load power consumption level, re-determine updated condensed information that updates the condensed information and comprises one or more updated scalar or vector values that represent the load-specific information after the adjustment, and communicate the updated condensed information to the secure, distributed transaction ledger.

One or more aspects of some embodiments herein may be directed towards, for example, receiving, by a transaction ledger comprising a processor, respective condensed datasets representative of respective load-specific information received from respective load controllers, wherein the respective load controllers are coupled to control a power-consuming load that obtains power from a power grid, and wherein the respective condensed datasets are smaller in size than respective full datasets associated with the respective load controllers, and determining a global value and a step size based on the respective condensed datasets and a specified aggregated control action level. Aspects comprise sending the global value and the step size to the respective load controllers for use in adjusting respective local power consumptions of the respective load controllers to satisfy the specified aggregated control action level, receiving respective updated condensed datasets from the respective load controllers that update the respective condensed datasets, wherein the respective updated condensed datasets are based on the respective load-specific information associated with the power-consuming load of the respective load controllers after the adjusting of the respective local power consumptions in respective step directions determined by the respective load controllers, and determining, from the respective updated condensed datasets, whether the respective load controllers have satisfied the specified aggregated control action level to a defined extent, and in response to determining that the specified aggregated control action level has not been satisfied to the defined extent. Other aspects comprise determining an updated global value and an updated step size based on the respective updated condensed datasets and the specified aggregated control action level, and sending the updated global value and the updated step size to the respective load controllers for use in further adjusting the respective local power consumptions to satisfy the specified aggregated control action level.

One or more aspects of some embodiments herein may be directed towards communicating load-related power range data to a secure, distributed transaction ledger, wherein the load-related power range data from the load controller and other load-related power range data from one or more other load controllers of the group of distributed load controllers are usable by the secure, distributed transaction ledger to determine initialization data that is to be received by the load controller in response to the communicating of the load-related power range data, and is to be sent to the one or more other load controllers. Further described herein is receiving the initialization data from the secure, distributed transaction ledger, determining condensed load-specific information of a power-consuming load managed by the load controller based at least in part on the initialization data and communicating the condensed load-specific information to the secure, distributed transaction ledger, wherein the condensed load-specific information from the load controller and other condensed load-specific information from the one or more other load controllers are usable by the secure, distributed transaction ledger to determine a step size and a global quantities (e.g., multiplier value) that are to be received by the load controller in response to the communicating of the condensed load-specific information and are to be sent to the one or more other load controllers. One or more aspects comprise receiving the step size and the global quantities from the secure, distributed transaction ledger; based on the step size and the global quantities from the secure, distributed transaction ledger, determining a step direction, adjusting the load power consumption in the step direction, determining current condensed load-specific information after the adjusting of the load power consumption, and communicating the current condensed load-specific information to the secure, distributed transaction ledger, wherein the current condensed load-specific information from the load controller and other current condensed load-specific information from the one or more other load controllers are usable by the secure, distributed transaction ledger to evaluate whether aggregated control action levels of the group of distributed load controllers have converged to a defined convergence level, and in response to the aggregated control action levels being determined not to have converged to the defined convergence level, determining a new step size that replaces the step size and a new global quantity that replaces the global quantity based on the current condensed load-specific information and the other current load-specific information, and wherein the new step size and the new global quantity are to be received by the load controller and/or sent to the other load controllers. One or more other aspects may comprise receiving the new step size and the new global quantity, and in response to the aggregated control action levels being determined to have converged to the defined convergence level, ending the operations until a later time.

Some aspects of the present disclosure might be susceptible to various modifications and alternative constructions, yet certain illustrated implementations thereof are shown in the drawings and have been described above in detail. It should be understood, however, that there is no intention to limit the present disclosure to the specific forms disclosed, but on the contrary, the intention is to cover all modifications, alternative constructions, and equivalents falling within the spirit and scope of the present disclosure.

In some embodiments, the distributed optimization framework disclosed herein to address and solve a global optimization problem in a distributed manner may be adapted, configured, and otherwise utilized to control aspects of an aircraft, including power and propulsion (sub-)systems thereof. The distributed iterative solution approach introduced and discussed in detail hereinabove (primarily in the context and application to the control of a power grid for illustrative purposes) can be configured and applied to aircraft power and propulsion systems, including their associated power and thermal management sub-systems. In some embodiments, the aircraft might comprise an Integrated Propulsion, Power, and Thermal Management System (IPPTMS), a hybrid-electric, electric, and other types of power and propulsion systems.

Regarding an optimization for control of an aircraft propulsion system, each component of the propulsion system solves a local optimization problem with local constraints and states for the respective component while a cost function for the component incorporates one or more global optimization variables (e.g., Lagrange multiplier(s)) to supplement information from other components (i.e., agents) to satisfy the power and/or thermal needs (i.e., command(s)) for the system. In accordance with the discussion above, the global optimization variables (e.g., Lagrange multiplier(s)) are calculated at an aggregated level using information gathered from the components of the propulsion system at each global iteration and is broadcast to each component of the propulsion system at each iteration to address and solve the network optimization problem of meeting power and thermal command needs in a distributed manner.

In some aspects, a propulsion system may be subject to multiple constraints to achieve mission objectives while minimizing, for example, fuel burn, where the constraints might include, for example, thrust, power generation, and thermal constraints (e.g., cooling capacity, etc.). In some embodiments, thermal constraints might be treated independently, wherein thrust constraint(s) might be satisfied by engine/flight controllers. In some embodiments, aircraft components might have more than one cost or capability, wherein the one or more costs and/or capabilities are considered in a modeling of the component.

The aircraft power and propulsion system optimization problem (similar in some aspects to the power grid optimization problem above) is solved by a distributed approach, wherein each component of the system optimizes a modified local cost function. The modified local cost function is the sum of local cost (e.g., energetic cost to operate the component of the propulsion system) and Lagrange multiplier(s) times the quantity being constrained (e.g., heat flow, power, thrust, etc.) for the component of the propulsion system. The value of the Lagrange multiplier(s) shared among the components of the propulsion system is calculated at the aggregator level, wherein the Lagrange multiplier(s) is a function of all of the local data sent to the aggregator at each iteration of the optimization algorithm and the needed thermal and/or power profile(s), as discussed above with respect to FIGS. 1-3. The calculated Lagrange multiplier(s) is sent back to components of the propulsion system, where they can be used in the cost for a next iteration. As components of the propulsion system iterate synchronously, they converge to an optimal solution for network/global optimization problem (e.g., FIG. 3, operation 312) through the iterative distributed computation scheme and/or framework disclosed herein.

The iterative distributed framework, as disclosed hereinabove in great detail and depicted in, for example, FIG. 3, can be described as follows with respect to solving global optimization problems for a propulsion system. In the context of a propulsion system, the "loads" of FIG. 3 (and the power grid example in general) are substituted by a component of the aircraft power and propulsion system, including subsystems thereof and thermal management components of the aircraft.

Each component of the propulsion system solves the search direction for the local nonlinear programming problem (NLP) and as a side product, a set of data are also generated that are sent to the aggregator (e.g., FIG. 3, operations 306, 308). At the aggregator level, using the data collected from the components (i.e., sub-systems) of the propulsion system and the commanded thermal and/or power profile(s), the shared Lagrange multiplier(s) are calculated and then sent to each of the components of the propulsion system, in the event the calculated shared Lagrange multiplier(s) and step size are not determined to meet a predetermined convergence (e.g., FIG. 3, operations 310, 312, and 314). Using the newly calculated value of the Lagrange multiplier(s), a new search direction is calculated by the components, the new dataset from each component is sent to aggregator, and the aggregator uses the new dataset and commanded profile(s), wherein this process is iteratively repeated until the desired convergence criterion is met (e.g., FIG. 3). When the convergence criterion is determined to be satisfied by the aggregator, the aggregator sends a notification (e.g., a "done" indicator per FIG. 5, operation 520), and each of the components uses the value(s) that produced the convergence to control operation of their respective component.

In some aspects, the aggregator does not know the optimal action(s) performed by the components (i.e., sub-systems) to achieve the convergence. In this manner, the components might not reveal details regarding their identity, configuration, and/or their local constraints (e.g., power demand, thermal heat consumption, heat pumping capability, propulsion, etc.) to the aggregator.

In some aspects, the aggregator(s) receive an abstraction of information from the components of the propulsion system. That is, no information regarding a component's model number, manufacturer, and/or other possible identifying information is provided to (or needed by) the aggregator(s). This aspect of the present disclosure is applicable to the power grid example (and others), wherein details regarding the loads therein (e.g., whether a load is a residential building, office, retail store, etc.) is not provided to the aggregator.

The computational burden(s) on the aggregator of the distributed optimization framework herein is relatively light since a large portion of the calculations are determined, while also considering the global command(s), at the component (i.e., agent) level. This aspect contributes to the scalability of the distributed optimization framework herein, as well as respecting the privacy of the components of the power and propulsion system.

In some aspects, a distributed optimization framework herein may be implemented by distributing the computations of the processes herein across multiple different, distributed computing systems and/or across multiple processors of a single computing system/device. In some embodiments, one (centralized) computing system having multiple CPUs (central processing units) operating in parallel, may operate to compute the datasets for the plurality of components comprising an aircraft power and propulsion system controlled to follow a global command power, thrust, and thermal command(s).

In addition to the various implementations described herein, it is to be understood that other similar implementations can be used or modifications and additions can be made to the described implementation(s) for performing the same or equivalent function of the corresponding implementation(s) without deviating therefrom. Accordingly, the present disclosure is not to be limited to any single implementation, but rather is to be construed in breadth, spirit and scope in accordance with the appended claims.

What is claimed is:

1. A system, comprising:
    an aircraft propulsion system comprising at least one component controller, each component controller associated with a component contributing to at least one commanded global constraint of the propulsion system; and
    a distributed transaction system communicatively coupled to and receiving data from the at least one component controller, the data comprising initial data regarding at least one operating constraint of the component associated with each component controller and the distributed transaction system sending an initial ratio value, calculated based on the initial data, to the at least one component controller that uses the initial ratio value to set a local control action level to an initial level, the at least one component controller and the distributed transaction system cooperatively communicate and iteratively operate to achieve optimal control actions at each component by operating to:
        receive, by the at least one component controller, global optimization variables from the distributed transaction system, the global optimization variables being calculated based on information from the at least one component controller;
        update, by each component controller, local optimization variables based on the received global optimization variables and generate a dataset that is sent to the distributed transaction system;
        determine, by the distributed transaction system using the generated dataset from the at least one component controller and a commanded propulsion system profile, updated global optimization variables;
        send, in the event a predetermined convergence criteria is not met, the updated global optimization variables to the at least one component controller;
        calculate, by each of the at least one component controller and based on at least the updated global optimization variables, a new dataset; and
        send the new dataset to the distributed transaction system which, until the predetermined convergence criteria is met, uses the new dataset and commanded profile to generate new global optimization variables.

2. The system of claim 1, wherein the at least one global command constraint is one of a thrust constraint, a thermal constraint, a power constraint, and combinations thereof.

3. The system of claim 2, wherein the thrust constraint is dependent on aircraft engine and flight controllers.

4. The system of claim 1, wherein the propulsion systems comprise one of an Integrated Propulsion, Power, and Thermal Management System (IPPTMS), a hybrid-electric system, and an all-electric system.

5. The system of claim 1, wherein the at least one local operating constraint of the component is one of a power demand constraint, a thermal heat consumption constraint, a heat pumping capability, and a propulsion constraint.

6. The system of claim 1, wherein a step size value is iteratively determined and received from the distributed transaction system that enables a quadratic convergence to a specified aggregated propulsion-related level.

7. The system of claim 1, wherein the distributed transaction system comprises a secure, distributed transaction ledger.

8. The system of claim 7, wherein the secure, distributed transaction ledger comprises blockchain technology.

9. The system of claim 1, wherein the distributed optimization scheme can enforce any coupling constraint among all or a subset of components.

10. A method comprising:
    communicatively coupling a distributed transaction system to at least one component controller of an aircraft propulsion system comprising the at least one component controller wherein each component controller is associated with a component contributing to at least one commanded global constraint of the propulsion system, the distributed transaction system receiving data from the at least one component controller of the aircraft propulsion system, the data comprising initial data regarding at least one operating constraint of the component associated with each component controller; and
    sending, by the distributed transaction system, an initial ratio value, calculated based on the initial data, to the at least one component controller that uses the initial ratio value to set a local control action level to an initial level, the at least one component controller and the distributed transaction system cooperatively communicate and iteratively operate to achieve optimal control actions at each component by operating to:
        receive, by the at least one component controller, global optimization variables from the distributed transaction system, the global optimization variables being calculated based on information from the at least one component controller;
        update, by each component controller, local optimization variables based on the received global optimization variables and generate a dataset that is sent to the distributed transaction system;

determine, by the distributed transaction system using the generated dataset from the at least one component controller and a commanded propulsion system profile, updated global optimization variables;

send, in the event a predetermined convergence criteria is not met, the updated global optimization variables to the at least one component controller;

calculate, by each of the at least one component controller and based on at least the updated global optimization variables, a new dataset; and send the new dataset to the distributed transaction system which, until the predetermined convergence criteria is met, uses the new dataset and commanded profile to generate new global optimization variables.

11. The method of claim 10, wherein the at least one global command constraint is one of a thrust constraint, a thermal constraint, a power constraint, and combinations thereof.

12. The method of claim 11, wherein the thrust constraint is dependent on aircraft engine and flight controllers.

13. The method of claim 10, wherein the propulsion systems comprise one of an Integrated Propulsion, Power, and Thermal Management System (IPPTMS), a hybrid-electric system, and an all-electric system.

14. The method of claim 10, wherein the at least one local operating constraint of the component is one of a power demand constraint, a thermal heat consumption constraint, a heat pumping capability, and a propulsion constraint.

15. The method of claim 10, wherein a step size value is iteratively determined and received from the distributed transaction system that enables a quadratic convergence to a specified aggregated propulsion-related level.

16. The method of claim 10, wherein the distributed transaction system comprises a secure, distributed transaction ledger.

17. The method of claim 16, wherein the secure, distributed transaction ledger comprises blockchain technology.

18. The method of claim 10, wherein the distributed optimization scheme can enforce any coupling constraint among all or a subset of components.

* * * * *